US007316341B2

(12) United States Patent
Schnell et al.

(10) Patent No.: US 7,316,341 B2
(45) Date of Patent: Jan. 8, 2008

(54) ADJUSTABLE EXHAUST ASSEMBLY FOR PNEUMATIC FASTENERS

(75) Inventors: John W. Schnell, Anderson, SC (US); Daniel Paxton Wall, Humboldt, TN (US); Daniel U. Goodwin, Lexington, TN (US); Barbara A. Rose, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 114 days.

(21) Appl. No.: 11/064,423

(22) Filed: Feb. 22, 2005

(65) Prior Publication Data

US 2005/0189393 A1 Sep. 1, 2005

Related U.S. Application Data

(60) Provisional application No. 60/546,685, filed on Feb. 20, 2004.

(51) Int. Cl.
*B23B 45/04* (2006.01)
*F16K 31/12* (2006.01)

(52) U.S. Cl. ...................... 227/130; 227/156; 173/218; 173/168; 173/169

(58) Field of Classification Search ................ 227/130, 227/156; 173/218, 168, 169; 137/596
See application file for complete search history.

(56) References Cited

U.S. PATENT DOCUMENTS

| | | | |
|---|---|---|---|
| 3,232,511 A | 2/1966 | Crooks | 227/130 |
| 3,320,860 A | 5/1967 | Bade | 91/461 |
| 3,351,256 A | 11/1967 | Readyhough | 227/130 |
| 3,398,648 A | 8/1968 | Cairatti | 91/417 |
| 3,438,449 A | 4/1969 | Smith | 173/17 |
| 3,464,614 A | 9/1969 | Volkmann | 227/130 |
| 3,496,840 A | 2/1970 | Wandel et al. | 92/85 |
| 3,498,517 A | 3/1970 | Novak | 227/8 |
| 3,527,142 A | 9/1970 | Obergfell | 91/461 |

(Continued)

FOREIGN PATENT DOCUMENTS

| | | |
|---|---|---|
| DE | 1935783 | 7/1969 |

(Continued)

OTHER PUBLICATIONS

Porter-Cable "Round Head Framinng Nailer, FR350A," Part No. 910442; © 2005 Porter-Cable Corporation.

*Primary Examiner*—Brian Nash
(74) *Attorney, Agent, or Firm*—Scott B. Markow

(57) ABSTRACT

An adjustable exhaust assembly for a pneumatic fastener includes a base, which includes a base plate and a protrusion protruding from the base plate. The protrusion is centrally hollow and includes an inner surface and an outer surface. The base plate includes an inlet opening and an exhaust opening defined therethrough. The inlet opening is interconnected with a channel defined by the inner surface of the protrusion. A cap is coupled to and supported by the base and includes an exit opening. A quick connector coupler is positioned inside the channel defined by the inner surface of the protrusion. When coupled to a pneumatic fastener, the quick connector coupler is suitable for connecting to an air supply hose to input compressed air to the pneumatic fastener via the channel defined by the inner surface of the protrusion and the inlet opening, and exhaust from the pneumatic fastener may exit through the exhaust opening and the exit opening.

19 Claims, 17 Drawing Sheets

U.S. PATENT DOCUMENTS

| | | | | |
|---|---|---|---|---|
| 3,568,909 | A | 3/1971 | Perkins | 227/130 |
| 3,622,062 | A | 11/1971 | Goode, Jr. et al. | 227/130 |
| 3,657,968 | A | 4/1972 | Lange | 91/398 |
| 3,708,095 | A | 1/1973 | Briggs, Jr. | 227/126 |
| 3,708,096 | A | 1/1973 | Burke, Jr. | 227/130 |
| 3,715,069 | A | 2/1973 | O'Conner | 227/130 |
| 3,774,293 | A | 11/1973 | Golsch | 29/432.1 |
| 3,788,195 | A | 1/1974 | Lange | 91/457 |
| 3,797,723 | A | 3/1974 | Perkins et al. | 227/109 |
| 3,895,562 | A | 7/1975 | El Guindy | 91/308 |
| 3,901,130 | A | 8/1975 | Lange | 91/461 |
| 3,905,535 | A | 9/1975 | Novak et al. | 227/120 |
| 4,030,655 | A | 6/1977 | Rothfuss et al. | 227/130 |
| 4,039,113 | A | 8/1977 | Males | 227/130 |
| 4,053,093 | A | 10/1977 | Thueringer | 227/5 |
| 4,053,094 | A | 10/1977 | Males | 227/93 |
| 4,117,767 | A | 10/1978 | Elliesen | 91/461 |
| 4,294,391 | A | 10/1981 | Obergfell | 227/130 |
| 4,480,528 | A | 11/1984 | Shiroyama | 91/461 |
| 4,784,308 | A | 11/1988 | Novak et al. | 227/130 |
| 4,932,480 | A | 6/1990 | Golsch | 173/139 |
| 4,986,164 | A | 1/1991 | Crutcher | 91/461 |
| 5,014,898 | A | 5/1991 | Heidrich | 227/130 |
| 5,020,712 | A | 6/1991 | Monacelli | 227/8 |
| 5,025,971 | A | 6/1991 | Schafer et al. | 227/156 |
| 5,080,273 | A * | 1/1992 | Meyer | 227/8 |
| 5,110,030 | A | 5/1992 | Tanji | 227/130 |
| 5,131,579 | A | 7/1992 | Okushima et al. | 227/8 |
| 5,180,091 | A * | 1/1993 | Ota | 227/8 |
| 5,207,143 | A | 5/1993 | Monacelli | 91/442 |
| 5,217,153 | A | 6/1993 | Yamamoto et al. | 227/130 |
| 5,259,465 | A | 11/1993 | Mukoyama | 173/168 |
| 5,261,587 | A | 11/1993 | Robinson | 227/8 |
| 5,273,200 | A | 12/1993 | Hoefler | 227/136 |
| D353,664 | S | 12/1994 | Eminger et al. | D8/69 |
| 5,437,339 | A | 8/1995 | Tanaka | 173/210 |
| 5,452,835 | A | 9/1995 | Shkolnikov | 227/8 |
| 5,560,528 | A * | 10/1996 | Chen | 227/130 |
| D379,912 | S | 6/1997 | Burke et al. | D8/68 |
| 5,637,125 | A | 6/1997 | Amada | 55/385.1 |
| 5,647,525 | A | 7/1997 | Ishizawa | 227/113 |
| D383,657 | S | 9/1997 | Kaiser | D8/69 |
| 5,671,880 | A | 9/1997 | Ronconi | 227/130 |
| 5,706,996 | A | 1/1998 | Lee | 227/130 |
| 5,709,332 | A | 1/1998 | Coop | 227/66 |
| 5,715,986 | A * | 2/1998 | Sauer | 227/130 |
| 5,720,422 | A | 2/1998 | Ichikawa et al. | 227/120 |
| 5,725,142 | A | 3/1998 | Hamada | 227/130 |
| 5,732,870 | A | 3/1998 | Moorman et al. | 227/130 |
| 5,829,660 | A | 11/1998 | White | 227/8 |
| 5,850,961 | A | 12/1998 | Braun et al. | 227/130 |
| 5,873,510 | A | 2/1999 | Hirai et al. | 227/130 |
| 5,881,941 | A | 3/1999 | Lai | 227/130 |
| 5,913,370 | A * | 6/1999 | Chapelle et al. | 173/169 |
| 5,918,370 | A * | 7/1999 | Wells | 30/228 |
| 5,918,788 | A | 7/1999 | Moorman et al. | 227/8 |
| 5,927,584 | A | 7/1999 | Akiba | 227/130 |
| 6,024,269 | A | 2/2000 | Ho et al. | 227/130 |
| 6,039,231 | A | 3/2000 | White | 227/130 |
| 6,041,992 | A | 3/2000 | Poinelli et al. | 227/130 |
| 6,059,166 | A | 5/2000 | Ho et al. | 227/130 |
| 6,059,167 | A | 5/2000 | Ho et al. | 227/130 |
| 6,079,605 | A | 6/2000 | Braun et al. | 227/130 |
| 6,087,436 | A | 7/2000 | Larrow et al. | 524/517 |
| 6,089,436 | A * | 7/2000 | Ho et al. | 227/130 |
| D433,908 | S | 11/2000 | Kaiser | D8/69 |
| 6,145,727 | A * | 11/2000 | Mukoyama et al. | 227/130 |
| 6,149,356 | A * | 11/2000 | Chu et al. | 408/56 |
| 6,161,628 | A * | 12/2000 | Liu | 173/168 |
| D435,769 | S | 1/2001 | Etter et al. | D8/68 |
| 6,173,963 | B1 | 1/2001 | Ho et al. | 227/361 |
| 6,186,386 | B1 | 2/2001 | Canlas et al. | 227/142 |
| 6,189,759 | B1 | 2/2001 | Canlas et al. | 227/120 |
| 6,196,331 | B1 * | 3/2001 | Naito et al. | 173/169 |
| 6,220,496 | B1 | 4/2001 | Hirai et al. | 227/130 |
| D442,453 | S | 5/2001 | Etter et al. | D8/70 |
| 6,371,348 | B1 | 4/2002 | Canlas et al. | 227/8 |
| 6,382,492 | B1 | 5/2002 | Moorman et al. | 227/8 |
| 6,394,332 | B2 | 5/2002 | Akiba | 227/8 |
| 6,431,425 | B1 | 8/2002 | Moorman et al. | 227/8 |
| 6,431,429 | B1 | 8/2002 | Canlas et al. | |
| D463,964 | S | 10/2002 | Oh | D8/70 |
| 6,572,000 | B2 | 6/2003 | Hirai et al. | 227/130 |
| 6,626,081 | B2 | 9/2003 | Ho et al. | 91/394 |
| 6,648,202 | B2 | 11/2003 | Miller et al. | 227/130 |
| 6,783,044 | B2 | 8/2004 | Perra et al. | 227/8 |
| 6,820,855 | B1 * | 11/2004 | Heller et al. | 251/29 |
| 6,883,619 | B1 * | 4/2005 | Huang | 173/93.5 |
| 6,923,272 | B2 | 8/2005 | Jansson et al. | |
| 7,040,414 | B1 * | 5/2006 | Kuo | 173/179 |
| 2001/0004084 | A1 | 6/2001 | Hirai et al. | 227/130 |
| 2001/0017311 | A1 | 8/2001 | Hamano et al. | 227/120 |
| 2001/0048016 | A1 | 12/2001 | Akiba | 227/8 |
| 2003/0052152 | A1 | 3/2003 | Hamada | 227/120 |
| 2005/0189393 | A1 * | 9/2005 | Schnell et al. | 227/130 |
| 2005/0247750 | A1 * | 11/2005 | Burkholder et al. | 227/130 |
| 2006/0102687 | A1 * | 5/2006 | Schnell et al. | 227/130 |
| 2006/0249554 | A1 | 11/2006 | Butzen et al. | |

FOREIGN PATENT DOCUMENTS

| | | |
|---|---|---|
| DE | 3308698 | 3/1983 |
| DE | 19637203 | 9/1996 |
| EP | 0720892 | 7/1996 |
| EP | 0778109 | 6/1997 |
| JP | 63306518 | 12/1988 |
| JP | 2-152775 | 6/1990 |
| JP | 2-198775 | 8/1990 |
| JP | 5-131378 | 5/1993 |
| JP | 5-138548 | 6/1993 |
| JP | 6-79644 | 3/1994 |
| JP | 07236542 | 9/1995 |
| JP | 09109059 | 4/1997 |
| JP | 10108164 | 4/1998 |
| JP | 10-128681 | 5/1998 |
| JP | 11-179677 | 7/1999 |
| JP | 2002-263466 | 9/2000 |
| JP | 2001-96472 | 4/2001 |
| JP | 2001-162555 | 6/2001 |
| JP | 2001-328078 | 11/2001 |
| JP | 2002-127038 | 5/2002 |

* cited by examiner

ADJUSTABLE EXHAUST ASSEMBLY FOR PNEUMATIC FASTENERS

CROSS REFERENCE TO RELATED APPLICATIONS

The present application claims the benefit under 35 U.S.C. § 119(e) of U.S. Provisional Patent Application Ser. No. 60/546,685, entitled "Oil Free Head Valve for Pneumatic Nailers and Staplers," filed Feb. 20, 2004 which is herein incorporated by reference in its entirety.

FIELD OF THE INVENTION

The present invention generally relates to the field of power tools, and particularly to an adjustable exhaust assembly for pneumatic fasteners.

BACKGROUND OF THE INVENTION

Pneumatic power tools are commonly employed in a variety of work places to accomplish a diverse assortment of tasks. Typical pneumatic power tools include pneumatic fasteners such as pneumatic nail guns and pneumatic staple guns. These pneumatic fasteners often employ piston assemblies coupled with valve assemblies to provide the force desired to drive a fastener into a surface. It is understood that the flow of compressed air into and through these pneumatic tools must be controlled and directed.

Unfortunately, pneumatic fasteners may typically employ functional features for controlling and directing the air flow which involve expensive and time consuming manufacturing processes and result in decreased performance characteristics. For example, many pneumatic fasteners require a cross hole to be drilled and plugged or an angled hole to be drilled, both through an outer cap (e.g., aluminum cap), in order to get supply air from the air source, through the outer cap, and to the back side of the valve piston chamber. This may significantly increase manufacturing costs, which in turn may be passed on to the consumer.

Another problem associated with pneumatic fasteners, which employ the methods of getting the supply air to the valve piston chamber, as described above, is that these machined holes provide rough surfaces over which the air must travel. These rough surfaces may increase air flow turbulence/friction thereby reducing the efficiency of air flow travel and possibly decreasing the efficiency of the pneumatic fastener. Current solutions to overcome this friction problem typically involve the application of a lubricant to these surfaces. These lubricants may increase the cost of operating these pneumatic fasteners and decrease productivity as the pneumatic fasteners must halt operation in order to have the lubricant provided. This is an on-going problem as the lubricant has a limited useful lifespan and must be continuously replaced to assist in smoothing the surfaces over which the air flow must travel.

In a pneumatic fastener, an air inlet port is used to connect to an air supply hose to supply compressed air to the pneumatic fastener, and a separate exhaust port is used to let exhaust air of the pneumatic fastener exit to outside. This may increase the manufacture cost. Furthermore, the position of the exhaust port is often fixed on the pneumatic fastener. This may cause inconvenience to an operator. For example, when an operator operates the pneumatic fastener, the position of the exhaust port may happen to face the operator. As a result, the exhaust air blast exiting the pneumatic fastener may be directed toward the operator.

Thus, it would be desirable to provide an adjustable exhaust assembly, which may be used as both an air inlet port and an exhaust port for a pneumatic fastener and may enable an operator to adjust the direction of exhaust exiting the pneumatic fastener as the operator desires.

SUMMARY OF THE INVENTION

Accordingly, in a first aspect of the present invention a head valve assembly for a pneumatic fastener including a piston assembly reciprocated within a cylinder assembly for driving a fastener and a housing having an end cap for at least partially enclosing the head valve assembly is provided. In an exemplary embodiment, the head valve assembly includes a valve piston for causing supply pressure to be ported to the piston assembly for moving the piston assembly within the cylinder assembly from a non-actuated position to an actuated position for driving the fastener. Further, an inner cap is disposed within the end cap around the valve piston. The inner cap includes an inlet port for porting pressure to the valve piston. In addition, a main seal is coupled to the valve piston for sealing the cylinder assembly from supply pressure while pressure is ported to the valve piston by the inner cap for holding the piston assembly in the non-actuated position. The main seal seals pressure ported to the valve piston by the inner cap from supply pressure ported to the piston assembly.

In specific embodiments of the instant head valve assembly, the inner cap may further include an exhaust port for porting exhaust from the head valve assembly. Further, the inner cap may be formed of a lubricious plastic. In additional embodiments, the main seal includes a lip seal for forming a seal with the inner cap and may provide shock absorption to the piston assembly. In further embodiments, the main seal may be coupled to the valve piston by a snap-lock mechanism. In such embodiment, the main seal may include a plurality of legs while the valve piston may include a plurality of leg receivers for coupling the main seal to the valve piston. For example, the snap-lock assembly comprises a plurality of legs extending from the main seal and a plurality of leg receivers disposed in an inner surface of the valve piston, each of the plurality of legs being received in a corresponding one of the plurality of leg receivers for coupling the main seal to the valve piston. In such embodiment, the piston assembly may include a projection, the plurality of legs for receiving and retaining the projection upon return of the piston assembly from the actuated position to the non-actuated position. In further exemplary embodiments, a lip seal is disposed between the valve piston and the inner cap.

In additional specific embodiments of the head valve assembly, a compression spring may be employed for biasing the valve piston toward the piston assembly and causing the main seal to seal the cylinder assembly from supply pressure. For instance, the compression spring may trap the plurality of legs for preventing the main seal from separating from the piston valve by the piston assembly as the piston assembly moves from the non-actuated position to the actuated position. It is contemplated that the present head valve assembly may be coupled to various types of pneumatic fasteners including a pneumatic nailer and a pneumatic stapler.

In an additional exemplary aspect of the present invention, a fastener device including dual actuation mode capability is disclosed. The apparatus of the present invention permits a user to select between a contact actuation mode in-which a user pulls or draws a trigger and actuation of the fastener device is initiated by a contact safety assembly and a sequential actuation mode in-which the contact safety assembly is depressed first and the trigger initiates actuation of the fastening event. The fastener device includes a sliding contact safety assembly which is configured to reciprocate towards/away from a driver housing. The contact safety assembly includes a contact member for contacting a workpiece. A rotating rod is pivotally operable with respect to an intermediate linkage. A pivot pin may be attached to the intermediate linkage. The rotating rod may include a recess for receiving the pivot pin. The pivot pin is configured with a first shoulder or ledge and a second shoulder which is off-set from the first shoulder. The second shoulder is further away from an end of the rod, opposite the linkage, than the second shoulder. The rod may be rotated to orientate either the first or the second shoulders toward a trigger assembly. The trigger assembly is pivotally coupled, via a pivot pin, to the driver housing. Trigger assembly is constructed so that a portion of the trigger contacts with the selected shoulder on the rotating rod so that the rod acts a stop for the trigger. A trigger lever is preferably included for actuating a valve or the like for permitting compressed air (in the case of a pneumatic fastener) to enter a driver chamber for forcing a piston with a driver blade attached thereto to secure a fastener. A toggle switch may be included to engaged with the rod to allow for efficient rotation. Preferably, a toggle switch is configured to remain in a fixed position while the contact safety assembly slides.

In a further aspect, a depth adjustment system is included to permit varying the depth to which a fastener to be secured will be driven. In this aspect of the invention, a threaded thumb wheel is included to engage with a threaded portion of a pivot pin included on the intermediate linkage. A washer, biased into engagement with the thumb wheel, having a series of detents is included to secure the thumb wheel in the desired position along the pivot pin. The thumb wheel may be manipulated to increase or decrease the overall length of the contact safety system thereby varying the extent to which a fastener will be driven into a workpiece.

In a further exemplary aspect of the present invention, an adjustable exhaust assembly is provided. The adjustable exhaust assembly includes a base, which includes a base plate and a protrusion protruding from the base plate. The protrusion is centrally hollow and includes an inner surface and an outer surface. The base plate includes an inlet opening and an exhaust opening defined therethrough. The inlet opening is interconnected with a channel defined by the inner surface of the protrusion. A cap is coupled to and supported by the base and includes an exit opening. A quick connector coupler is positioned inside the channel defined by the inner surface of the protrusion. When coupled to a pneumatic fastener, the quick connector coupler is suitable for connecting to an air supply hose to input compressed air to the pneumatic fastener via the channel defined by the inner surface of the protrusion and the inlet opening, and exhaust from the pneumatic fastener may exit through the exhaust opening and the exit opening.

In a still further exemplary aspect of the present invention, a pneumatic fastener is provided. The pneumatic fastener includes a handle which includes an inlet channel and an outlet channel. An adjustable handle exhaust assembly is coupled to the handle for connecting to an air supply hose to input compressed air to the pneumatic fastener via the inlet channel and outputting exhaust of the pneumatic fastener via the outlet channel to outside. The adjustable handle exhaust assembly includes a base, a cap and a quick connector coupler. The base includes a base plate and a protrusion protruding from the base plate. The protrusion is centrally hollow and includes an inner surface and an outer surface. The base plate includes an inlet opening and an exhaust opening defined therethrough. The inlet opening is interconnected with a channel defined by the inner surface of the protrusion. The cap is coupled to and supported by the base and includes an exit opening. The quick connector coupler is positioned inside the channel defined by the inner surface of the protrusion. The quick connector coupler is suitable for connecting to the air supply hose to input the compressed air to the pneumatic fastener via the channel defined by the inner surface of the protrusion, the inlet opening, and the inlet channel, and the exhaust may exit through the outlet channel, the exhaust opening and the exit opening.

In another exemplary aspect of the present invention, a handle for a pneumatic fastener is provided. The handle includes an inlet channel for inputting compressed air into the pneumatic fastener, an outlet channel for outputting exhaust of the pneumatic fastener to outside, and an adjustable handle exhaust assembly coupled to the handle. The adjustable handle exhaust assembly includes a base, a cap, and a quick connector coupler. The base includes a base plate and a protrusion protruding from the base plate. The protrusion is centrally hollow and includes an inner surface and an outer surface. The base plate includes an inlet opening and an exhaust opening defined therethrough. The inlet opening is interconnected with a channel defined by the inner surface of the protrusion. The cap is coupled to and supported by the base and includes an exit opening. The quick connector coupler is positioned inside the channel defined by the inner surface of the protrusion. The quick connector coupler is suitable for connecting to an air supply hose to input the compressed air to the pneumatic fastener via the channel defined by the inner surface of the protrusion, the inlet opening, and the inlet channel, and the exhaust may exit through the outlet channel, the exhaust opening and the exit opening.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
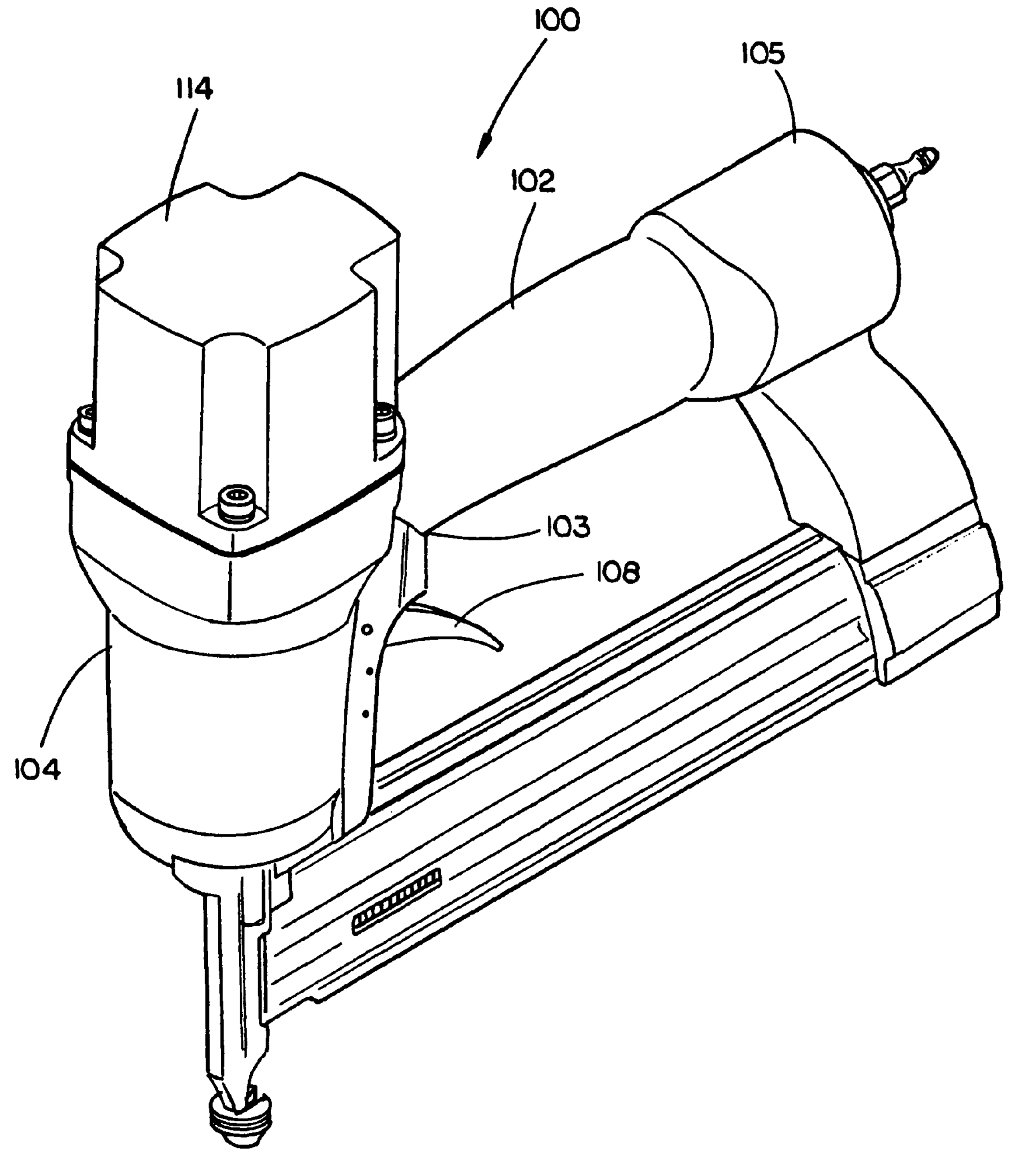
FIG. 1 is an illustration of a pneumatic fastener in accordance with an exemplary embodiment of the present invention.

Referring now to FIG. 1, an exemplary embodiment of a pneumatic fastener 100 in accordance with the present invention is provided. In the exemplary embodiment, the pneumatic fastener 100 includes a handle 102 having a first end 103 and a second end 105. In the present embodiment, a housing 104 is coupled with the first end 103 of the handle 102. The handle 102 further includes a handle adapter 156, which enables the coupling of a compressed air supply to the pneumatic fastener 100. In addition, a trigger assembly 108 for controlling the firing of the pneumatic fastener 100 may be coupled with the handle 102, proximal to the first end 103.

Figure 2:
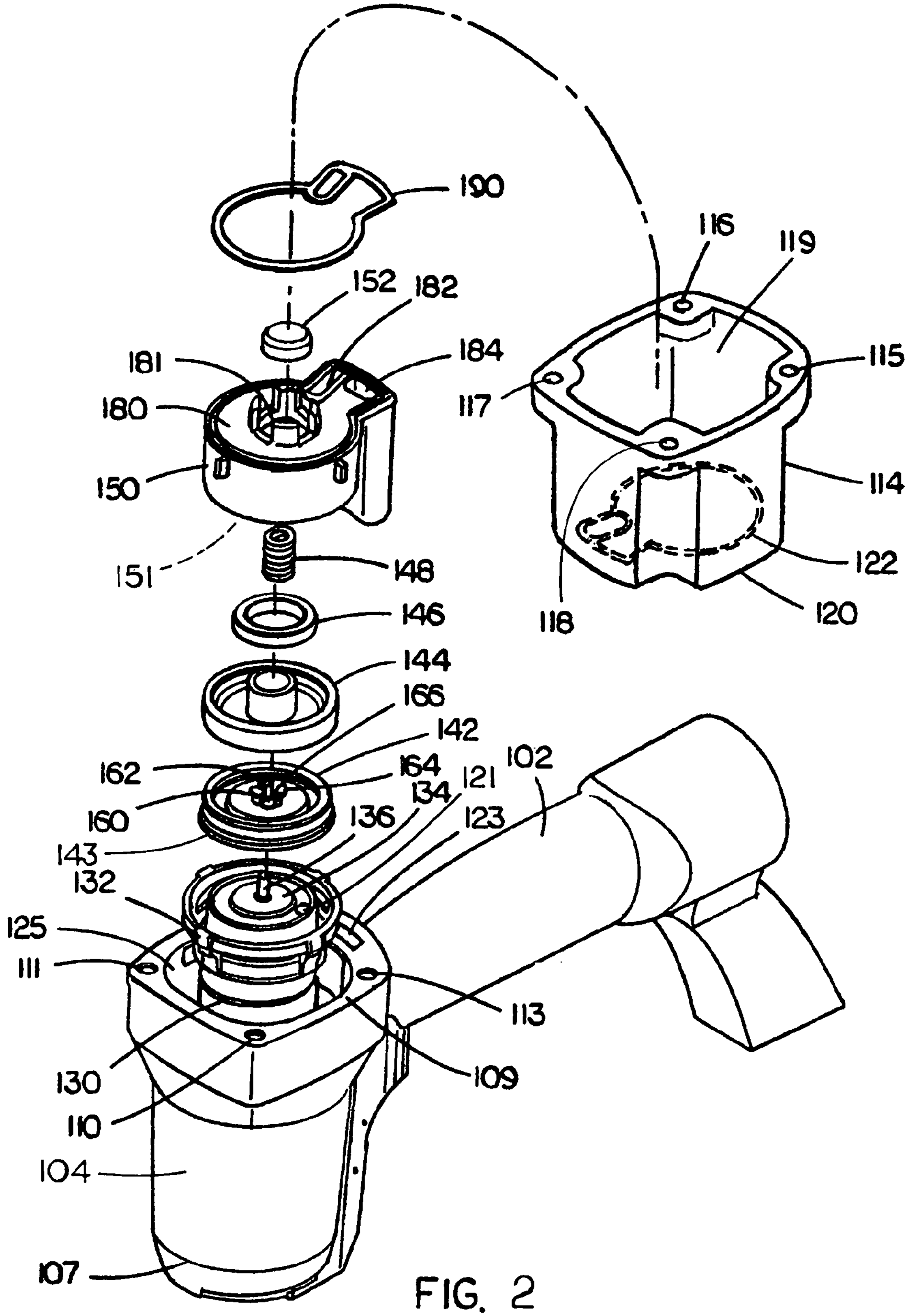
FIG. 2 is an exploded view of the pneumatic fastener including a head valve assembly coupled with a piston assembly in accordance with an exemplary embodiment of the present invention.

Referring now to FIG. 2, in the exemplary embodiment the housing 104 defines a housing recessed area 125 within which a piston assembly including a cylinder 130 and a piston 134 may be mounted. The cylinder 130 is slidably coupled with the piston 134 which includes a piston projection 136. It is understood that the piston 134 may operationally engage a driver blade for driving a fastener by providing force to the driver blade. The piston projection 136, in the current embodiment, is enabled in a generally cylindrical shape. Alternatively, the piston projection 136 may be configured in various shapes, such as rectangular, spherical, and the like.

In an exemplary embodiment, the housing 104 includes a first end 107 and a second end 109. The first end of the housing 107 may couple with various mechanical devices to enable the functionality of the nailer, such as a nose casting assembly, which may enable the operation of the driver blade. The second end 109 of the housing 104 includes a first housing fastening point 110, a second housing fastening 111, a third housing fastening point 112, and a fourth housing fastening point 113. In an advantageous embodiment, the fastening points allow the coupling of an outer cap 114 with the second end 109 of the housing 104. It is understood that the outer cap 114 may be composed of various materials, such as aluminum, steel, plastic, and the like. The fastening points may enable the use of a variety of fasteners. Suitable fasteners may include a screw, bolt, clip, pin, and the like. In the current embodiment, the cap 114 includes a first cap fastening point 115, a second cap fastening point 116, a third cap fastening point 117, and a fourth cap fastening point 118. The cap fastening points align with the housing fastening points to enable the fasteners to engage with the housing 104 and the cap 114 thereby securely affixing their position relative to one another.

Figure 6:
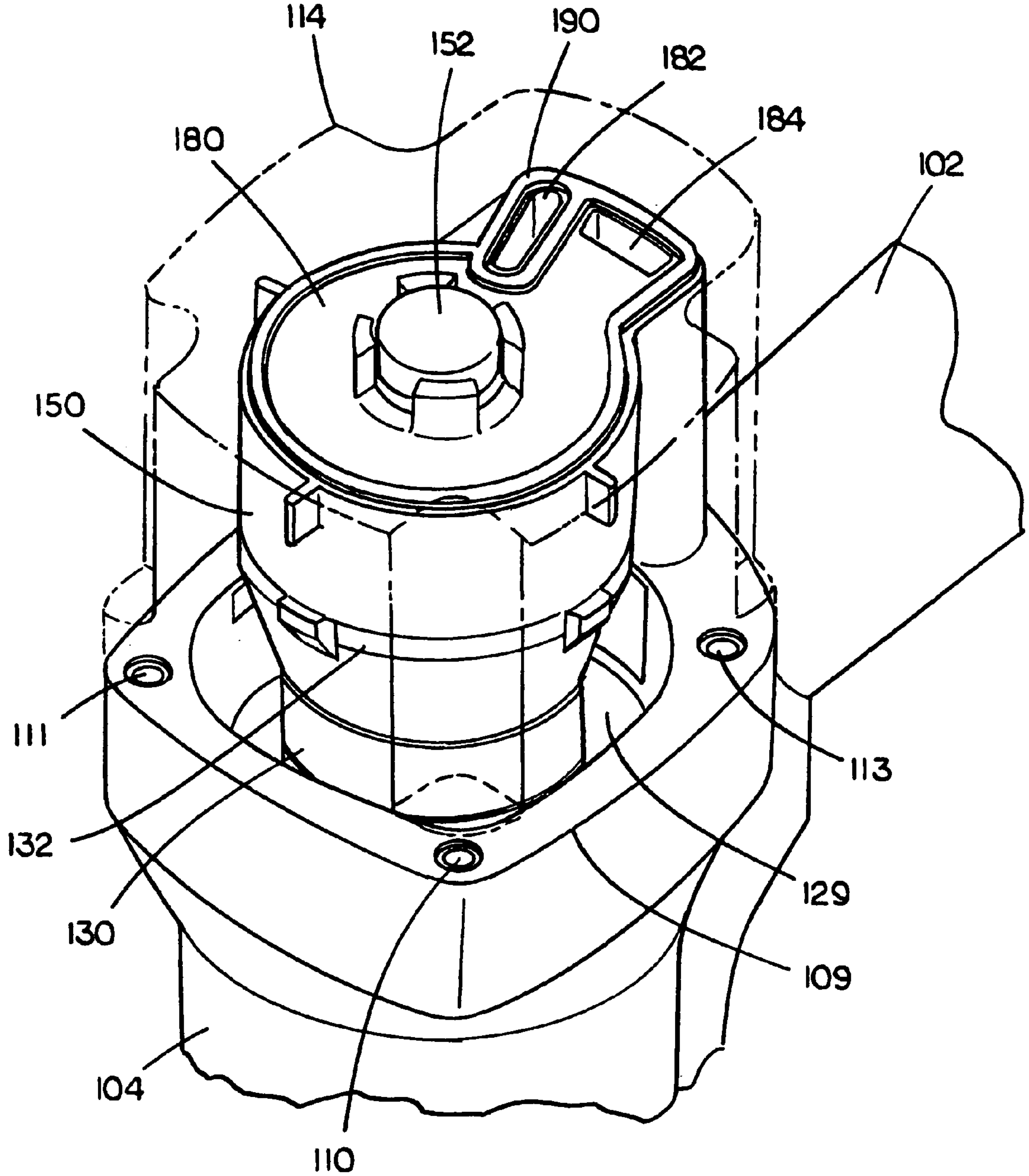
FIG. 6 is an isometric illustration of the head valve assembly coupled with a housing and a cap of the pneumatic fastener, wherein the head valve assembly at least partially occupies a fully defined recessed area of the pneumatic fastener.
Figure 7:
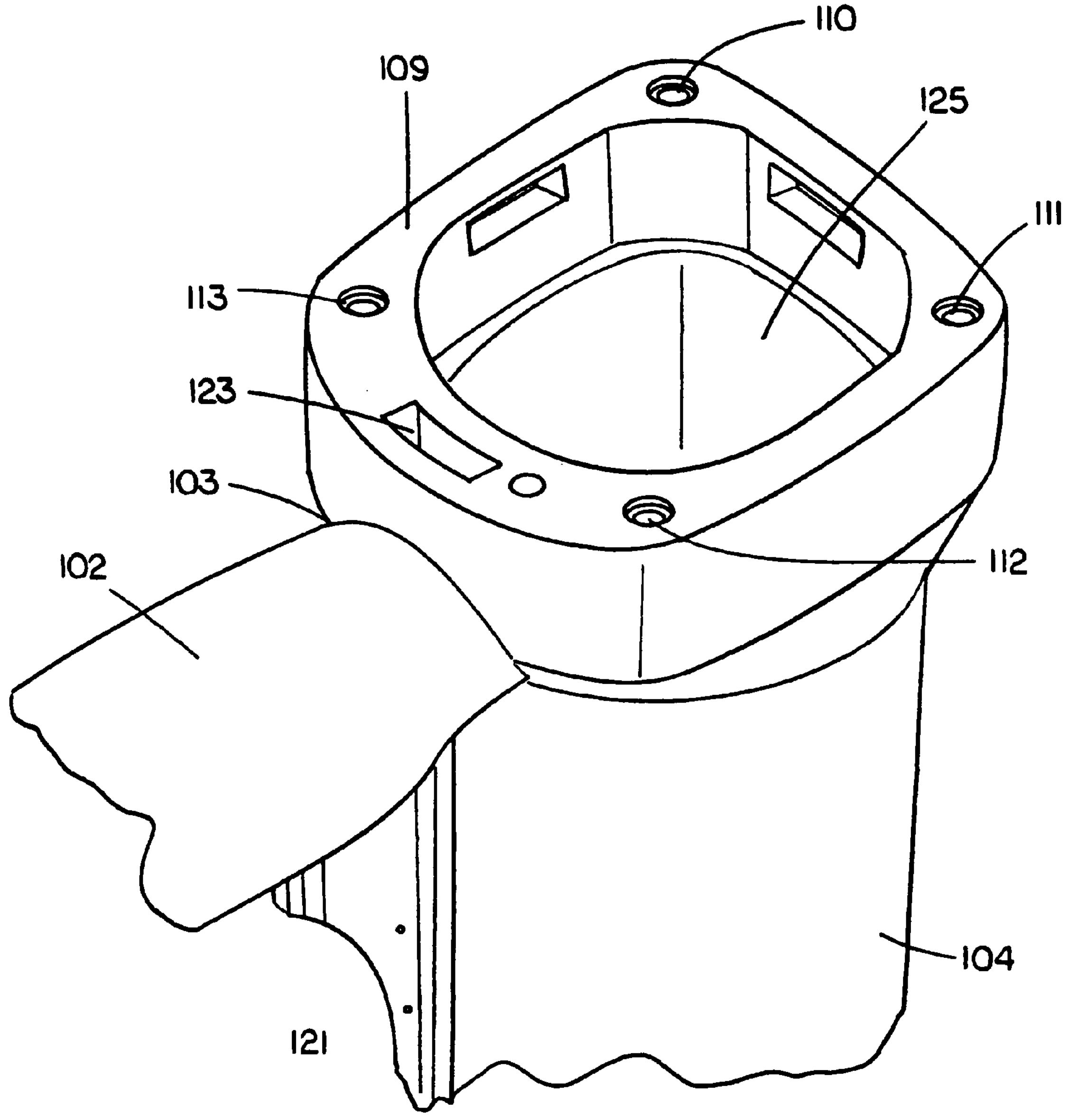
FIG. 7 is an isometric illustration of the housing including a housing inlet port and a housing outlet port.

In the exemplary embodiment, the housing recessed area 125 is defined on one end by the first end 107 of the housing 104 and on the other end by the second end 109 of the housing 104. The cap 114 further defines an outer cap recessed area 119. When the cap 114 is coupled with the housing 104, a fully defined recessed area 129 (as illustrated in FIG. 6), of the pneumatic fastener 100 is established. It is understood that various configurations of the housing 104 and the cap 114 may define variously configured recessed areas 129. It is contemplated that the configurations of the housing 104 and the cap 114 may partially encompass the recessed area 129. Further, the housing 104 and the cap 114 may be configured for aesthetic and/or functional purposes. For example, contouring may establish the housing 104 and the cap 114 with an advantageous appearance, which may also provide for increased functionality by providing a contoured grip region. Still further, grip regions may be established with material for grasping engagement by the hand of the user of the pneumatic fastener 100, including soft grips and the like.

Figure 3:
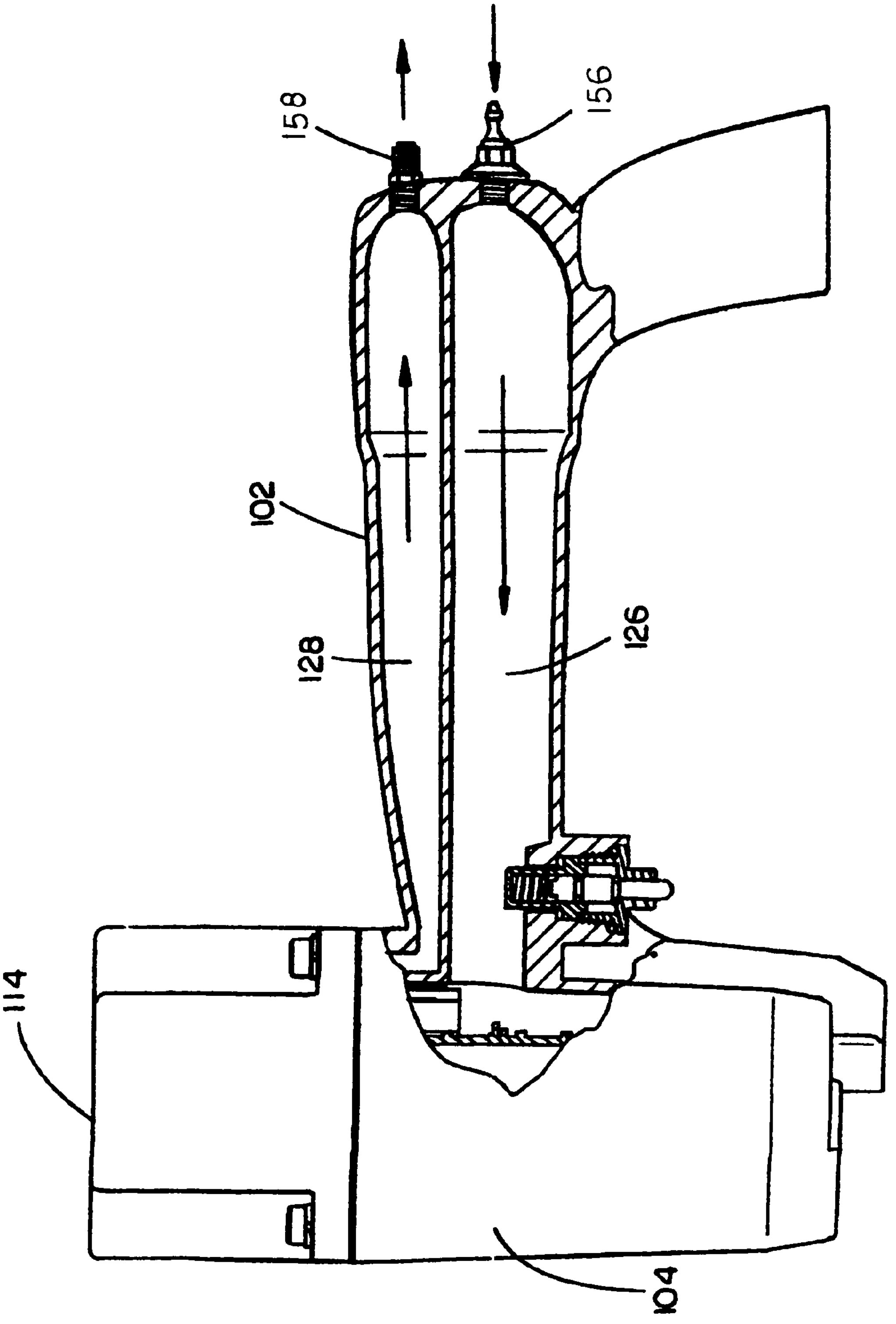
FIG. 3 is a cut away view of a handle of the pneumatic fastener including a handle adapter coupled with an inlet channel and an exhaust channel coupled with a handle exhaust.

As illustrated in FIG. 2, the housing 104 may further define an inlet (supply) port 121 and an outlet (exhaust) port 123. The configuration of the housing inlet port 121 and the housing outlet port 123 may vary. In a preferred embodiment, the housing inlet port 121 is of a generally cylindrically shaped conduit extending through the housing 104 while the housing outlet port 123 is of a generally rectangularly shaped conduit extending through the housing 104. It is understood that the shape and/or configuration of the housing inlet and outlet ports may be varied as contemplated by those of ordinary skill in the art. For instance, the diameter of the housing inlet port 121 may be increased or decreased to alter the characteristics of the supply pressure. As shown in FIG. 3, the housing inlet port 121 acts as a conduit for the supply of compressed air coming through the inlet channel 126 via the handle adapter 156 connection. In addition, the housing outlet port 123 acts as a conduit for the air exhausted after the firing of the pneumatic fastener, directing the exhaust to the outlet channel 128 and then through a handle exhaust 158 of the handle 102.

In further exemplary embodiments, as illustrated in FIG. 2, the pneumatic fastener 100 includes a head valve assembly with an inner cap 150 for directing the flow of air to and from the piston 134 of the piston assembly of the fastener 100. In an exemplary embodiment, a basket 132 is included within the inner cap 150 for stabilizing the piston 134. In an alternative embodiment, the basket 132 is not included within the inner cap 150, but directly seated upon the cylinder 130.

In the present exemplary embodiment, the head valve assembly at least partially occupies the recessed area 129. Further, a main seal 142 is adjustably coupled with an inner diameter 151 of the inner cap 150. The main seal 142 is further coupled with the piston 134 and a valve piston 144. In a preferred embodiment, the main seal 142 is seated upon the piston 134. This coupling allows the main seal 142 to provide shock-absorption to the piston 134 of the pneumatic fastener 100. The main seal 142, in a preferred embodiment, may be composed of a urethane material. Alternative materials, such as other plastics, metals, and the like, may be employed as contemplated by those of skill in the art which include the desired durability. Additionally, in such advantageous embodiment, the valve piston 144 is composed of a plastic material. It is further preferred that the plastic be an acetal which includes compounds that are characterized by the grouping $C(OR)_2$, such as Delrin®, a registered trademark owned by the E.I. du Pont de Nemours and Company. Such composition provides the valve piston 144 with a reduced frictional coefficient while still enabling a secure coupling with the main seal 142.

As further illustrated in FIG. 2, in an exemplary embodiment, an O-ring gasket 190 connects the top side 180, of the inner cap 150, with an inner wall 120 of the cap recessed area 119 of the aluminum cap 114. The O-ring gasket 190 provides a seal between the aluminum cap 114 and the inner cap 150. It is understood that the O-ring gasket 190 may enable various degrees of stretching and/or deflecting depending on the materials used to establish the O-ring gasket 190. This seal assists in directing the air flow provided into and out of the head valve assembly 140 via the inner cap inlet conduit 182 and the inner cap outlet conduit 184. In a preferred embodiment, the O-ring gasket 190 may nest in a groove established in the inner wall 120 of the aluminum cap 114. In an alternative embodiment, the O-ring gasket 190 may nest in a groove established in the top side 180 of the inner cap 150. It is further contemplated that the O-ring gasket 190 may be integrated with either the inner wall 120 of the aluminum cap 114 or the top side 180 of the inner cap 150.

Figure 4:
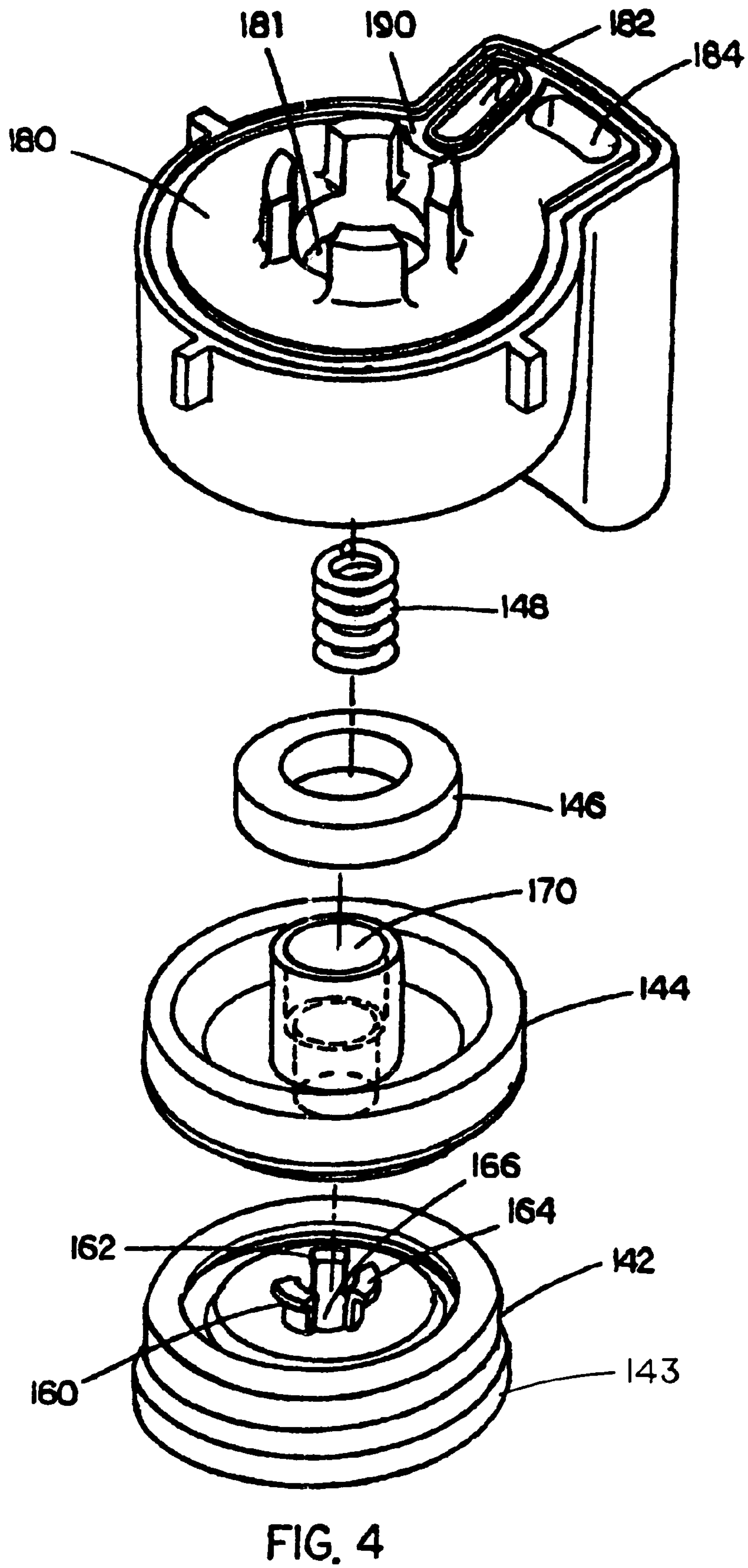
FIG. 4 is an illustration of the head valve assembly, the inner cap having an inner diameter coupled with a main seal and valve piston.

As illustrated in FIG.4, the inner cap 150 is further comprised of an inner cap exhaust conduit 184. The inner cap outlet conduit 184 directs the flow of exhausted air to the housing outlet port 123, established in the second end 109, of the housing 104, which is connected to the exhaust channel 128 within the handle 102. Thus, the exhausted air is removed from the head valve assembly 140 via the inner cap 150.

Figure 5:
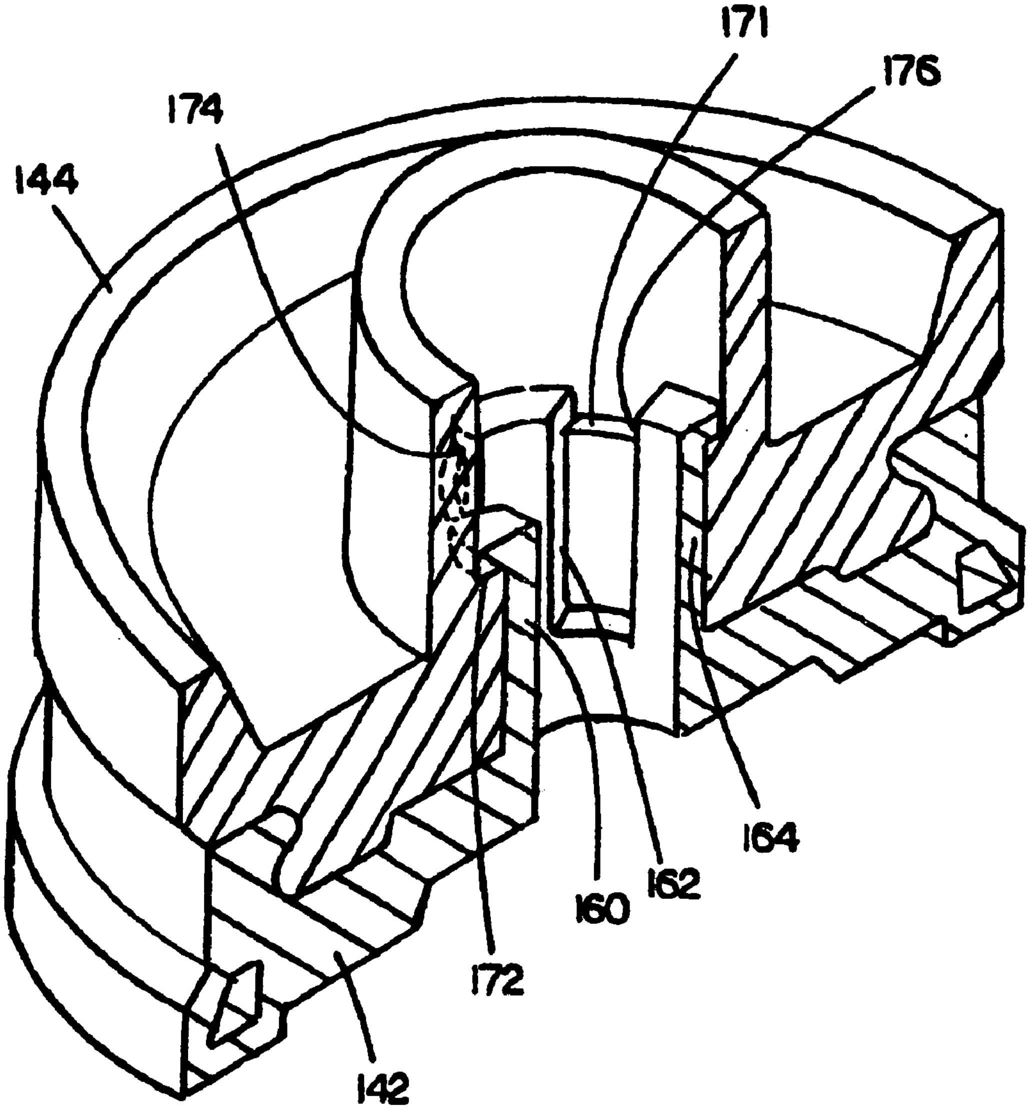
FIG. 5 is an illustration of the main seal connected with the valve piston through use of a snap lock mechanism.

It is contemplated that the coupling of the main seal 142 with the piston 134 may be accomplished in a variety of ways. For example, in an exemplary embodiment, the main seal 142 is coupled with the valve piston 144 via a snap lock mechanism. In an advantageous embodiment, as illustrated in FIGS. 4 and 5, the snap lock mechanism is enabled by a first leg 160, a second leg 162, and a third leg 164 which are connected to the main seal 142. In configuration, the legs 160 through 164 generally extend from the main seal 142 and include a tapered undercut on a flange included within each of the three legs. Further, on the end opposite the connection to the main seal 142, each leg terminates in a tab, which generally extends from the leg. The legs are formed about a piston projection receiving point 166. In the current embodiment, the piston projection receiving point 166 is an aperture, which extends through the main seal 142.

As illustrated in FIG. 5, in an exemplary embodiment, the legs 160 through 164 of the main seal 142 couple with a first leg receiver 172, a second leg receiver 174, and a third leg receiver 176, respectively. In the present embodiment, the leg receivers are disposed within a valve piston inner diameter of the valve piston 144. In a preferred embodiment, the three leg receivers are established by a ledge 171. In such embodiment, the ledge 171 includes three grooves for receiving the three legs of the main seal 142. In an alternative embodiment, the three leg receivers may be established as pockets disposed within the inner diameter of the valve piston 144. The three leg receivers 172 through 176 are configured with a matching profile to that of the three legs 160 through 164.

In operation, the three legs of the main seal 142 may be inserted within the three leg receivers of the valve piston 144. Upon being fully inserted, the tabs formed at the terminus of each leg may snap into place with respect to the leg receivers. The snapping into place may be accomplished in a variety of manners. In the present example, the material composition and configuration of the legs provide the force which snaps the tabs into place. The tabs assist in securing the position of the main seal 142 relative to the valve piston 144 by coupling the tabs against the valve piston 144. In alternative embodiments, the snap mechanism may be enabled as a spring loaded assembly and the like as contemplated by those of ordinary skill in the art. It is further contemplated that the main seal 142 and the valve piston 144 may be an integrated single unit.

In further exemplary embodiments, a secondary coupling of the valve piston 144 with the main seal 142 occurs via a tongue and groove assembly. The valve piston 144 includes a tongue member disposed about the circumference of a bottom edge of the valve piston 144. In a corresponding circumferential position on the main seal 142, a groove is established. Thus, when the main seal 142 is coupled with the valve piston 144, via insertion of the plurality of legs into the plurality of leg receivers, the tongue is inserted within the groove to provide secondary coupling support. It is contemplated that the secondary coupling characteristics may be provided through various alternative mechanisms. For example, the secondary coupling may be established by employing a friction lock mechanism, a compression lock mechanism, a latch mechanism, and the like, without departing from the scope and spirit of the present invention.

As illustrated in FIG. 6, in an exemplary embodiment, the piston projection receiving point 166 is configured to receive the piston projection 136. Therefore, as the configuration of the piston projection 136 is altered so to may the piston projection receiving point 166 and the three legs 160, 162, and 164 be altered to accommodate this change. The three legs 160 through 164, in a preferred embodiment, are enabled to trap and hold the piston projection 136 when extended through the piston projection receiving point 166.

Figure 8:
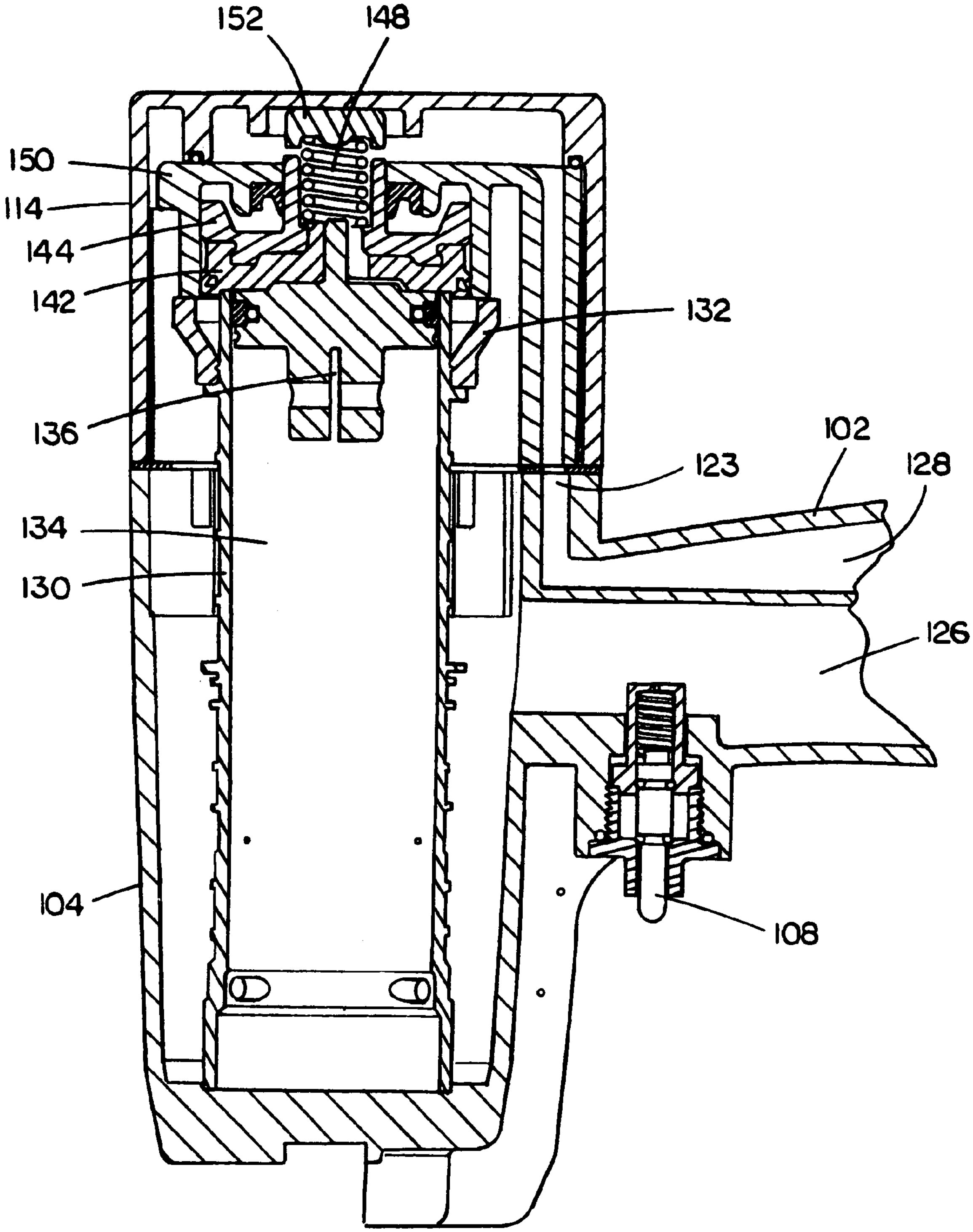
FIG. 8 is a cross-sectional view of the pneumatic fastener including the head valve assembly coupled with the piston assembly and the housing, the main seal and valve piston shown in a down position relative to the inner cap of the head valve assembly, in accordance with an exemplary embodiment of the present invention.
Figure 9:
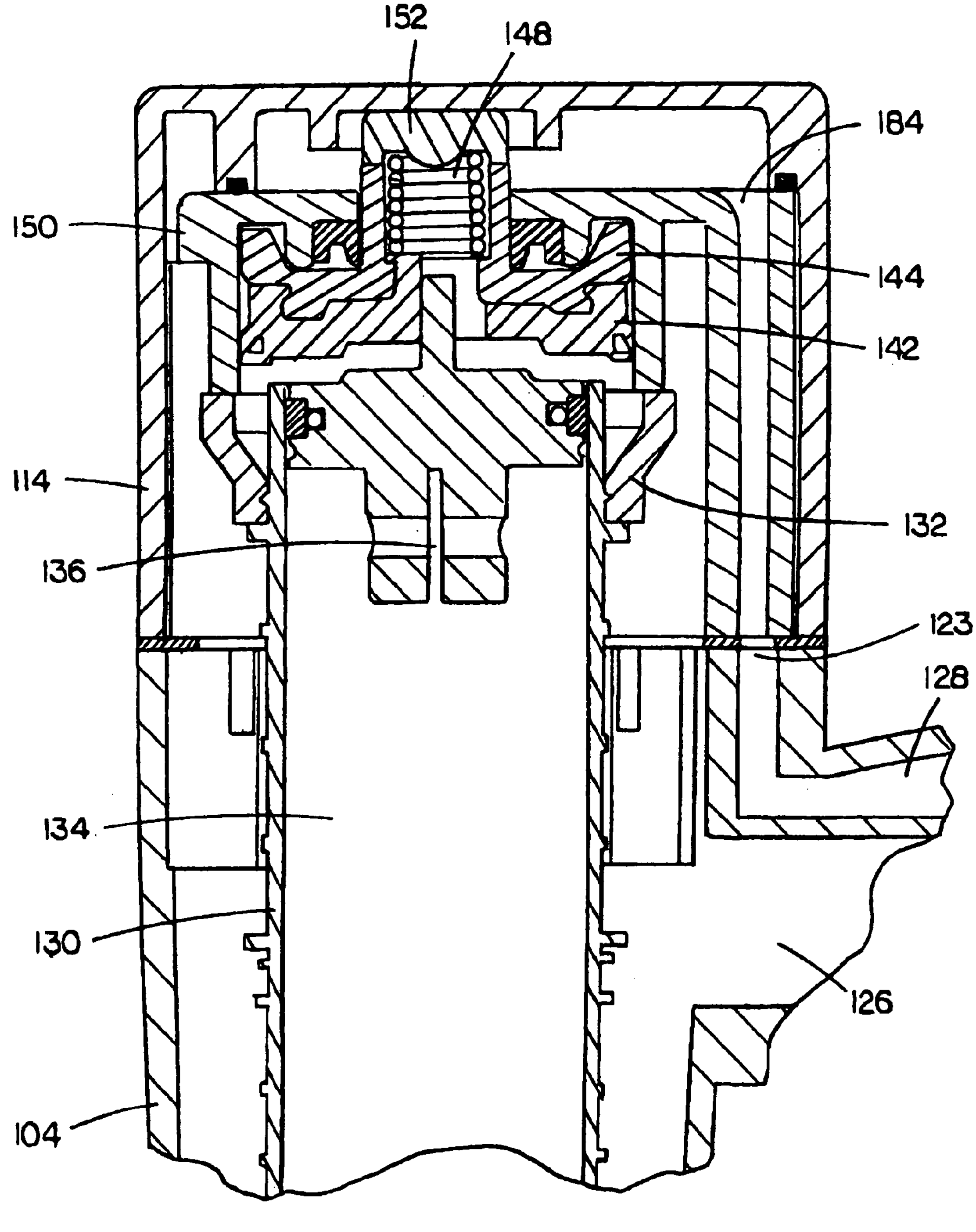
FIG. 9 is an expanded cross-sectional view of the pneumatic fastener wherein the main seal and valve piston are shown in an up position relative to the inner cap of the head valve assembly.

The securing of the piston projection 136 by the three legs may be accomplished using various mechanisms. In a preferred embodiment, the three legs serve as a piston catch by providing a friction fit for engaging against the piston projection 136. Alternatively, the enabling of the piston catch may occur through the use of compression assemblies, ball joint assemblies, and the like. It is understood that the three legs trap and hold the piston projection 136 when the piston 134 is established in an “up” position (as illustrated in FIG. 9). It is further contemplated that the cylinder 130 may include a counter bore to further assist in maintaining the piston in the "up" position. The "up" position is the pre-fire position or the position the piston 134 returns to after the pneumatic fastener 100 has fired, using the compressed air to drive the piston 134 into a "down" position (as illustrated in FIG. 8). The "down" position provides the force for driving the driver blade through the nose casting, engaging with a nail located within the nose casting, and driving the nail into a surface against which the nose casting is set. The piston catch established by the present invention may provide increased efficiency by reducing any unwanted travel by the piston 134 towards the "down" position when the pneumatic fastener 100 is not being fired. For instance, when the pneumatic fastener 100 is set in a position to fire the user may tap the surface, inadvertently, being operated upon with the gun. This tap may result in the piston 134 traveling towards the "down" position. This travel may reduce the operational effectiveness of the pneumatic fastener 100 by limiting the range of travel of the piston 134 during firing of the gun 100, thereby, limiting the force provided by the piston 134 in driving the fastener, such as the nail, by the pneumatic fastener 100. This limited force may result in the fastener failing to reach the desired depth, such as by not recessing properly, which may have the effect of requiring additional time spent to accomplish a task. This may limit productivity and increase expenses associated with completing the task.

In an exemplary embodiment, as illustrated in FIGS. 8 and 9, a compression spring 148 is coupled against a bumper seal 152 on one end and the three legs 160, 162, and 164, snapped in position relative to the valve piston 144, on the opposite end. In the exemplary embodiment, the compression spring 148 extends through a spring receiving point 181 (as shown in FIG. 4) of the inner cap 150. In the current embodiment, as shown in FIG. 4, the spring receiving point 181 is an aperture through a top side 180 of the inner cap 150. The coupling against the three legs snapped into position relative to the valve piston 144 enables the compression spring 148 to "trap" the legs (as illustrated in FIG. 9), thereby, assisting in preventing the main seal 142 from being pulled away from the valve piston 144 by the piston 134 when fired.

The functionality of the compression spring 148 in combination with the snap fit of the main seal 142 with the valve piston 144 assists in enabling the main seal 142 to establish and maintain a seal between the supply pressure and the pressure behind the valve piston 144. In the current embodiment, the main seal 142 includes a main lip seal 143 to further assist in providing the above mentioned functionality. The main lip seal 143 further enables the main seal 142 to slidably couple with the inner diameter 151 of the inner cap 150. Thus, the main lip seal 143 enables the main seal 142 to travel within the inner cap 150 and maintain the seal between the supply pressure and the pressure behind the valve piston 144. It is understood, that the travel of the main seal 142 translates into a travel of the valve piston 144, within the inner cap 150, and the compression or extension of the compression spring 148. A secondary lip seal 146 is set upon the valve piston 144. The secondary lip seal 146 is set on the side opposite the coupling of the main seal 142 against the valve piston 144. The secondary lip seal 146 may assist in providing a seal between the valve piston 144 and the inner cap 150.

It is contemplated that the inner cap 150 may be composed of various materials. For example, the inner cap 150 may be composed of Delrin®, a registered trademark owned by the E.I. du Pont de Nemours and Company. A composition including Delrin ® is advantageous for Delrin® is an acetal which is a lubricious plastic providing a surface which may reduce the amount of turbulence/friction involved with the travel of the compressed air into or out of the head valve assembly 140 of the present invention. Further, the use of Delrin® for the valve piston 144, as stated previously, may reduce the amount of turbulence/friction encountered by the valve piston 144 during travel of the valve piston 144 within the inner diameter 151 of the inner cap 150. The materials used for the inner cap 150 may further comprise alternative plastics, Teflon® (a registered trademark of DuPont), silicone, and the like. While the present invention is enabled with the inner cap 150, which directs the air flow into and out of the head valve assembly 140 without requiring lubricants to be added, it is contemplated that various lubricants may be used in conjunction with the present invention. Lubricants, such as Teflon® based lubricants, silicone based lubricants, and aluminum disulfide based lubricants may be employed without departing from the scope and spirit of the present invention.

Figure 10:
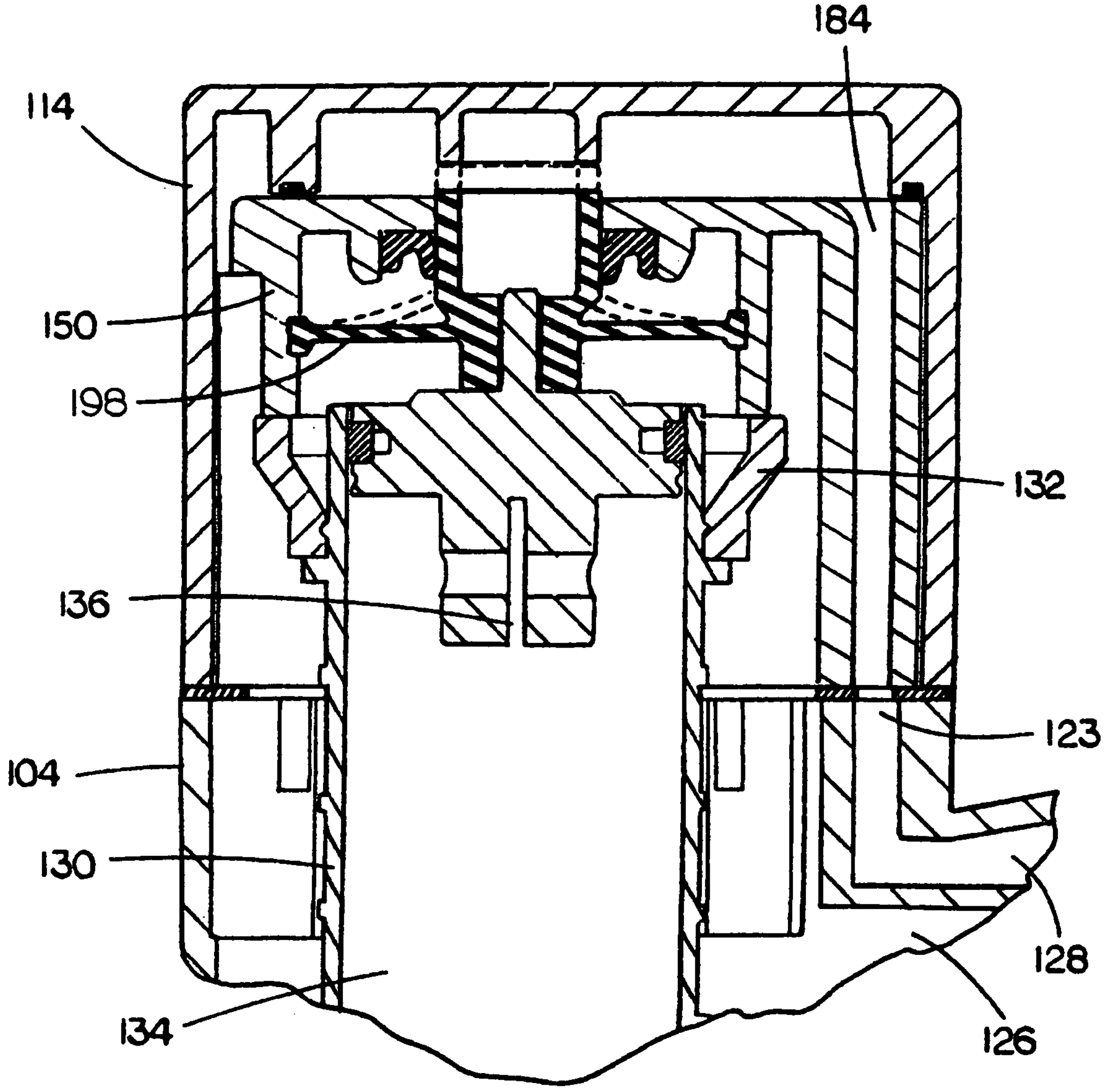
FIG. 10 illustrates the head valve assembly of the present invention employing a diaphragm coupled with the inner diameter of the inner cap.

In an alternative embodiment, the main seal 142 and valve piston 144 may be replaced by a diaphragm 198, as illustrated in FIG. 10. The diaphragm 198 provides the functionality of the main seal 142 coupled with the inner diameter 151 of the inner cap 150, of the head valve assembly 140. The diaphragm may also couple with the cylinder 130, at least partially surrounding the cylinder 134. The diaphragm may be composed of various materials, which provide various degrees of stretching and/or deflecting of the diaphragm. This stretching and/or deflecting may translate into movement by the diaphragm 198 within the inner diameter 151. As previously stated, this may further translate into the extension and/or compression of the compression spring 148. It is still further contemplated that the use of the diaphragm 198 may eliminate the need for the compression spring 148. It is understood that the configuration of the diaphragm 198 may be altered to accommodate the needs of the manufacturer, consumer, or those of ordinary skill in the relevant art. It is further contemplated that the diaphragm 198 may be employed in conjunction with the main seal 142 and the valve piston 144. The diaphragm 198 may couple with the main seal 142 and any stretching/deflecting of the diaphragm 198 within the inner diameter 151 of the inner cap 150 may translate into movement of the main seal 142 and valve piston 144 within the inner diameter 151.

During use, compressed air travels through the inner cap 150 and into the head valve assembly 140 via an inner cap inlet conduit 182. The inner cap inlet conduit 182 establishes an air flow pattern through the inner cap 150 from the inlet channel 126 of the handle 102. The housing inlet port 121, established on the second end 109 of the housing 104, enables the compressed air being provided through the inlet channel 126, to flow into the inner cap inlet conduit 182. The compressed air supplied through the inner cap inlet conduit 182 enables the head valve assembly 140 to operate the pneumatic fastener 100, i.e., the firing of the piston 134 to drive the fastener into a surface or work piece.

Referring to FIGS. 11–13C, a pneumatic fastener 1100 including a dual actuation mode assembly 1102 is discussed. Those of skill in the art will appreciate that while a pneumatic fastener is discussed, the principles of the present invention may equally apply to devices utilizing a combustion event or a detonation event to secure a fastener such as a nail, a staple, or the like. The dual actuation mode assembly 1102 permits user selection of the type of actuation the fastener device is to operate (e.g. in a contact fire mode or sequential actuation mode). In contact actuation mode, a user pulls (and holds) the trigger 1104 and subsequently the contact safety assembly 1106 is depressed or pushed inwardly toward a driver housing 1108 thereby activating a pneumatic valve 1109 for releasing compressed air to drive a piston and driver into contact with a nail or fastener disposed in the driver's path of travel. Subsequent fastening events, in contact actuation mode, may be initiated by movement of the contact safety towards the driver housing such as when the pneumatic fastener 1100 has been repositioned and pressed against a workpiece. In sequential fire mode, the contact safety assembly is depressed toward the driver housing and subsequently the trigger is pulled to initiate a fastening event (the driving of a nail, staple or the like).

Figure 11:
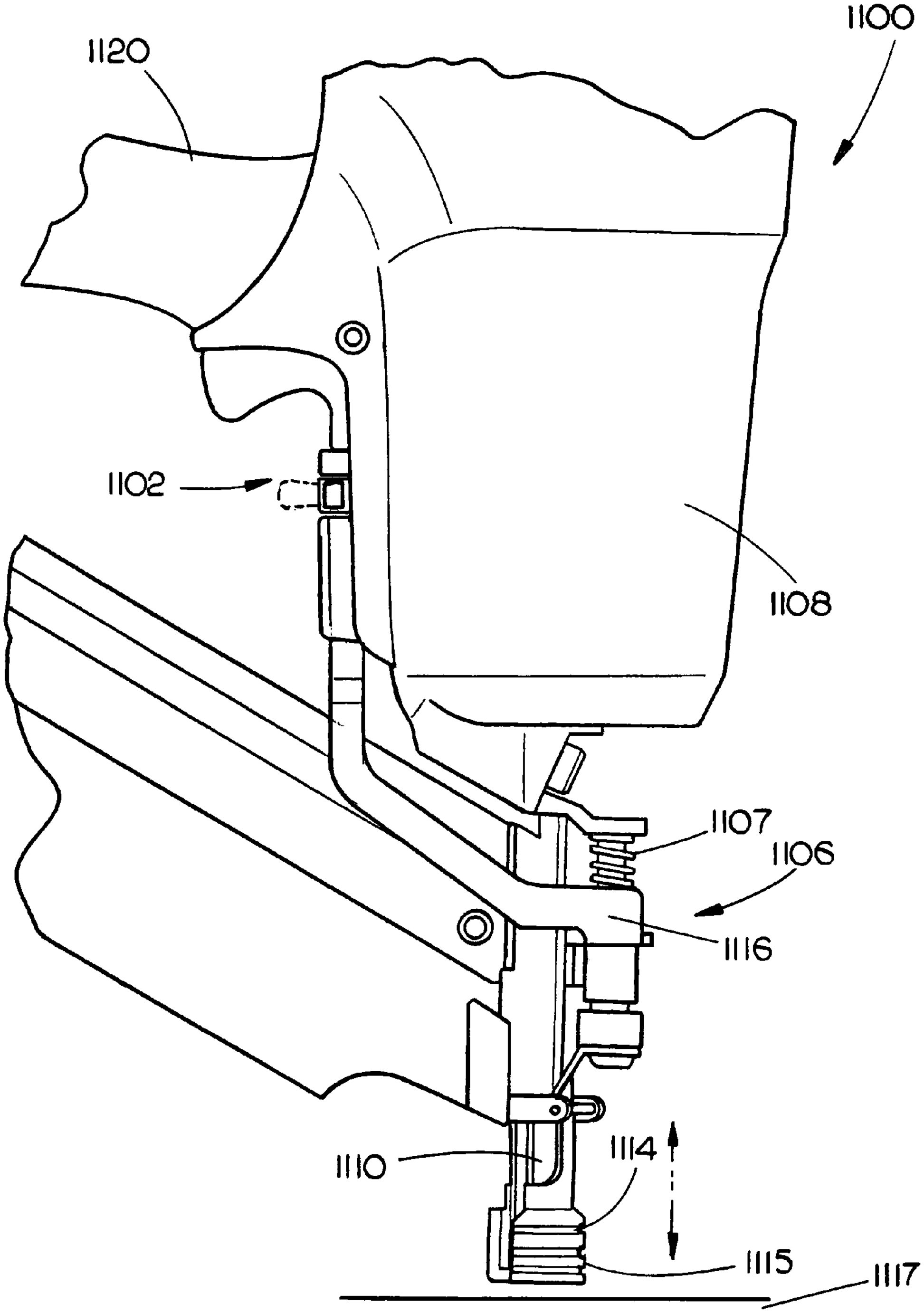
FIG. 11 is a partial side view illustration of a pneumatic fastener including a dual actuation mode assembly.
Figure 12:
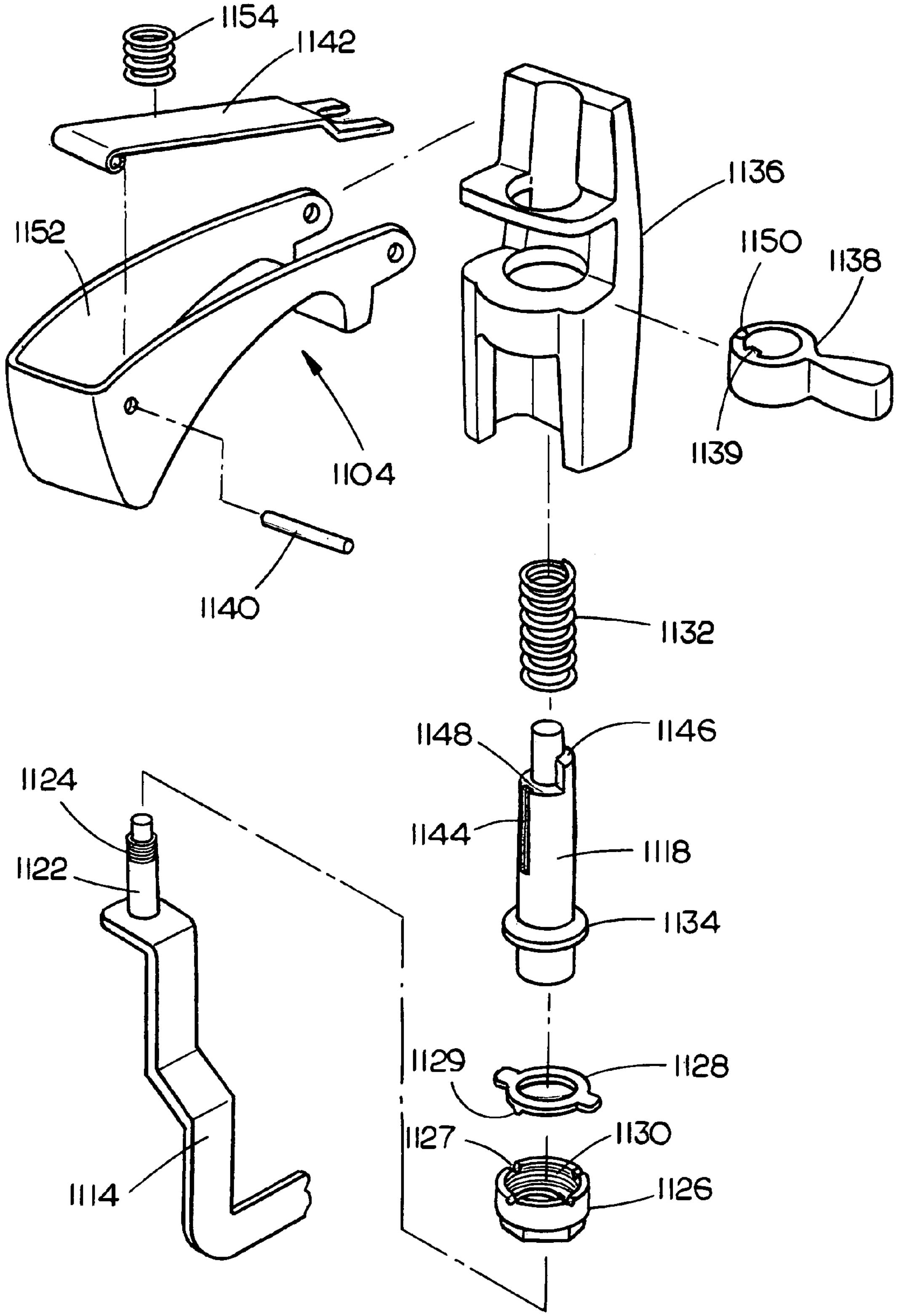
FIG. 12 is an exploded view of the contact safety illustrated in FIG. 11.

With particular reference to FIGS. 11 and 12, the pneumatic fastener 1100 includes the driver housing 1108 for housing a reciprocating piston including a driver blade attached thereto for driving a fastener disposed within the path of travel of the driver blade. A contact safety assembly 1106 is adjustably mounted to the driver housing 108 in order to permit the contact safety assembly to slide towards and away from to the driver housing/the nose 1110 of the driver housing. In various embodiments, the nose may be formed as a separate structure or may be integrally formed with the main portion of the driver housing 1108. Preferably, the contact safety assembly 1106 is biased, such as by a main spring or the like, into a remote position or away from the nose 1110 of the driver housing. Biasing the contact safety assembly away from the main portion of the fastener permits the contact safety system to function as a lock-out mechanism so that the pneumatic fastener cannot actuate. Additionally, as described above, the contact safety assembly 1106 may be utilized to initiate a fastening event (in contact mode).

The contact safety assembly 1106 includes a contact pad 1114 or foot for contacting with a workpiece. Additionally, a no-mar tip may be releasably connected to the contact pad for preventing marring of the workpiece, if the contact pad is formed of metal or includes a serrated edge for engaging a workpiece (such as in a framing nailer). For example, the contact pad 1114 may be shaped so as to translate or slide along the nose 1110 of the driver housing 1108. In the present embodiment, the contact pad 1114 is generally shaped as a hollow cylindrical structure for sliding along the generally cylindrical nose. An intermediate linkage 1116 is coupled to the contact pad 1114 to generally position a cylindrical rod 1118 along the driver housing 1108. For example, the movement of the intermediate linkage may permit the cylindrical rod 1118 to be variously positioned with respect to the driver housing 1108 and thus, a trigger assembly which is 1104 pivotally mounted to the driver housing 1108 and/or a handle 1120 fixedly secured to the driver housing 1108. In the current embodiment, the intermediate linkage 1116 is secured via a fastener to the contact pad 1114. In further embodiments, the contact pad and linkage may be unitary. In the present example, the intermediate linkage is constructed in a general L-shape to position the rod 1118 adjacent the trigger (i.e., towards the handle 1120). Additionally, the intermediate linkage may be constructed so as to generally conform to the driver housing, to avoid other pneumatic fastener components, i.e, avoid fastener magazine components, for aesthetic purposes or the like. Moreover, in the present instance, the intermediate linkage 1116 includes a pivot pin 1122 coupled to an end of the linkage 1116. The pivot pin 1122 may be secured via a fastener, a friction fit or unitarily formed with the intermediate linkage. In the present embodiment, the pivot pin 1122 is received in an aperture defined in a tab which extends generally perpendicular to a leg of the generally L-shaped linkage. A portion of the pivot pin 1122 may be received in a corresponding cylindrical recess formed in the rod 1118 for at least partially supporting/pivotally connecting the rod 1118 to the intermediate linkage via the pivot pin 1122.

Figure 13A:
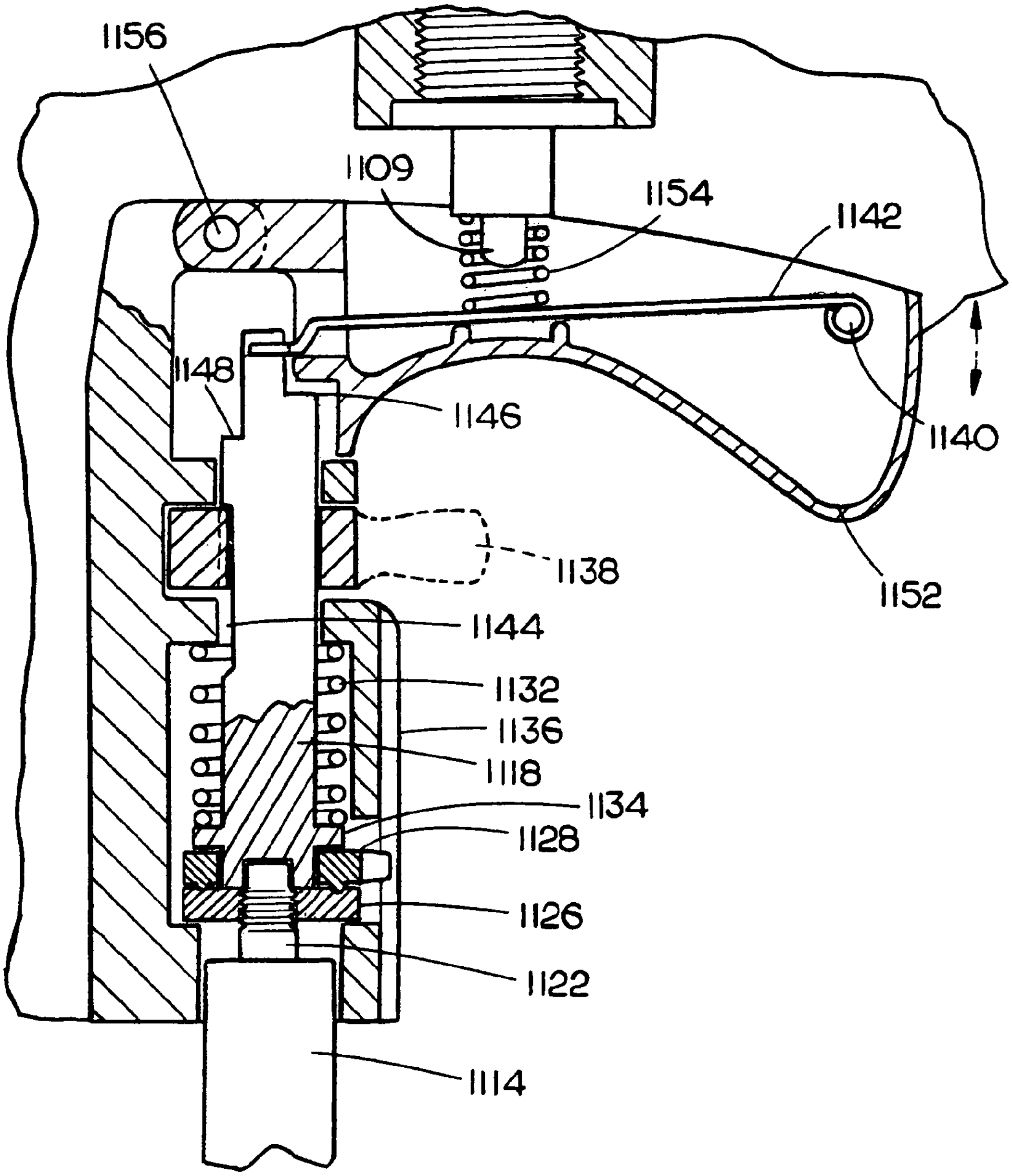
FIG. 13A is a cut-away side view of a dual actuation mode assembly.

Referring to FIGS. 12 and 13A, in an additional aspect of the present invention, the contact safety assembly 1106 includes an optional depth of drive or recess adjustment capability. A depth adjustment system permits a user to select to what extent the fastener is to be driven into the workpiece via selecting the extent to which the contact safety extends towards/away from the driver housing. Those of skill in the art will appreciate that a variety of factors will influence the depth to which a fastener will be driven. For example, a user may wish to leave the head of a nail above the surface of the workpiece (i.e. leave the nail proud) or may select to recess the nail head into the workpiece such that putty or filler may be filled into the recess thereby covering over the nail head (e.g., when building cabinetry or the like). In the present instance, the pivot pin 1122 includes a threaded portion 1124 or section for threading with a thumb wheel 1126. A thumb wheel 1126 includes a corresponding aperture having a threaded portion 1130 such that the thumb wheel 1126 may travel along the threaded length of the pivot pin 1122. The thumb wheel thereby may extend the overall length of the contact safety assembly and thus, vary the depth to which a fastener may be driven through interaction with the pneumatic valve 1109 for controlling the flow of compressed air into the driver cylinder. In the foregoing example, the thumb wheel 1126 may frictionally interconnect with a washer 1128, disposed between the thumb wheel 1126 and a lip/flange 1134 included on the rod, via a series of rib/grooves, detents and protrusions or the like. It is to be appreciated that the rod 1118 is permitted to freely pivot (e.g., not in threaded engagement) about the pivot pin 1122. For example, the rod 1118 and thus, the washer 1128 may be biased such as via a spring 1132 towards or into engagement with the thumb wheel 1126. Preferably, the washer 1128 may be geometrically shaped or include protrusions such that the washer 1128 does not rotate with the thumb wheel 1126, e.g., remains in a fixed orientation with respect to the driver housing and/or a secondary housing or contact safety housing 1136 coupled to the driver housing for at least partially encompassing at least a portion of the contact safety assembly. The series of protrusions/detents may act to retain the thumb wheel 1126 in a desired position along the pivot pin 1122. Those of skill in the art will appreciate that the depth adjustment mechanism may be formed with a threaded projection in threaded connection with an end of a rod so as to effectively extend/retract the overall length of the rod. In the previous example, the projection is received in a recess formed in an intermediate linkage such as a tab included on an end of the linkage. For example, a rod may include a threaded portion along which a thumb wheel is in threaded engagement while the terminal portion of the rod is inserted in an aperture in an intermediate linkage.

In further embodiments, a depth of drive mechanism may be disposed between the contact pad 1114 and an intermediate linkage 1116. Additionally, if a depth of drive or recess adjustment is not desired, the rod 1118 may extend into a recess or aperture included in a tab extending from an end of an intermediate linkage. In still further embodiments, a partially threaded pivot pin may be threaded into an aperture in the intermediate linkage and function as a pivot pin for the rod 1118. Alternatively, a rod may include an extension which may be received in an aperture in the intermediate linkage for achieving substantially the same functionality.

Figure 13B:
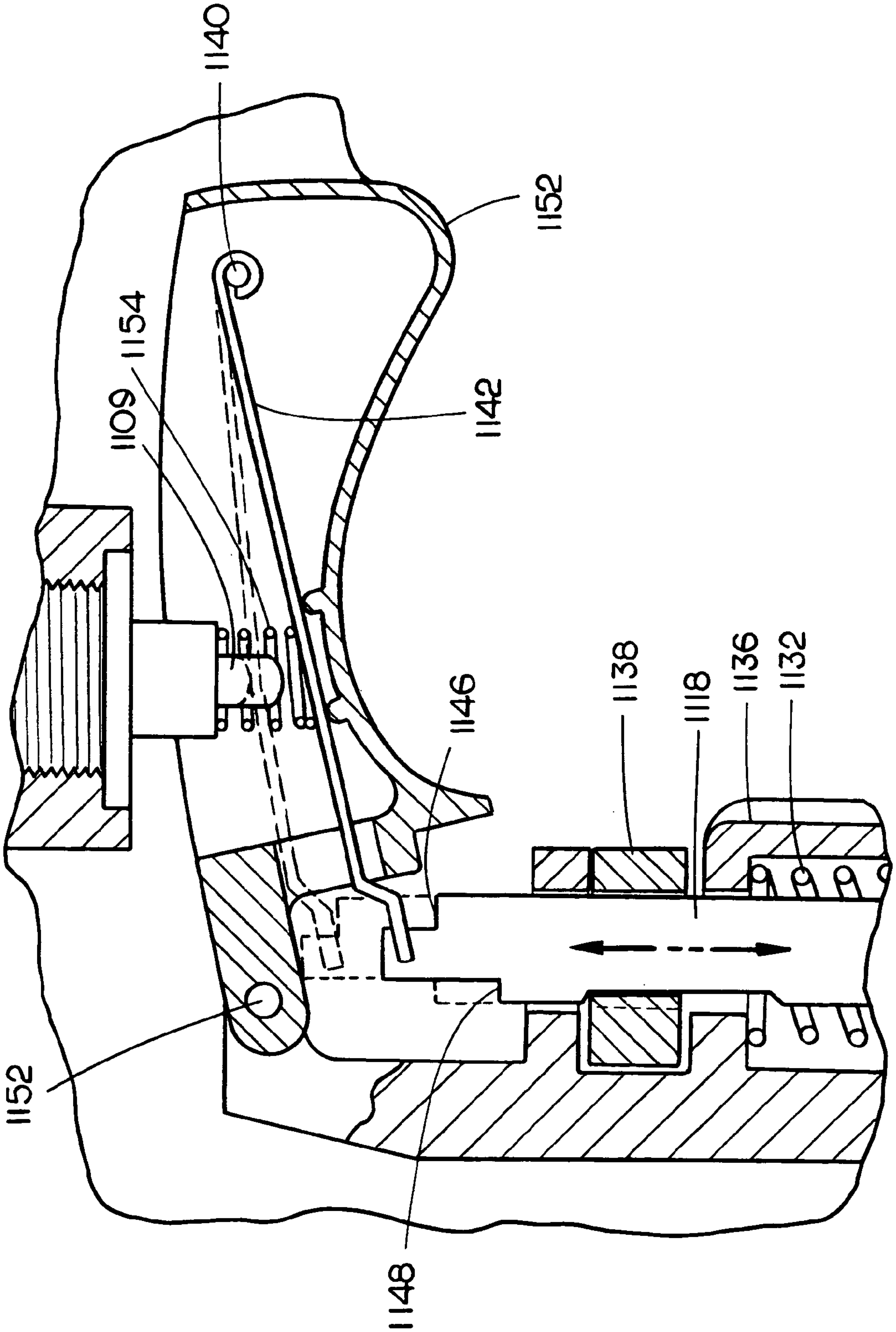
FIG. 13B is a cut-away side view of the dual actuation mode assembly illustrating a rotating rod in contact actuation mode.
Figure 13C:
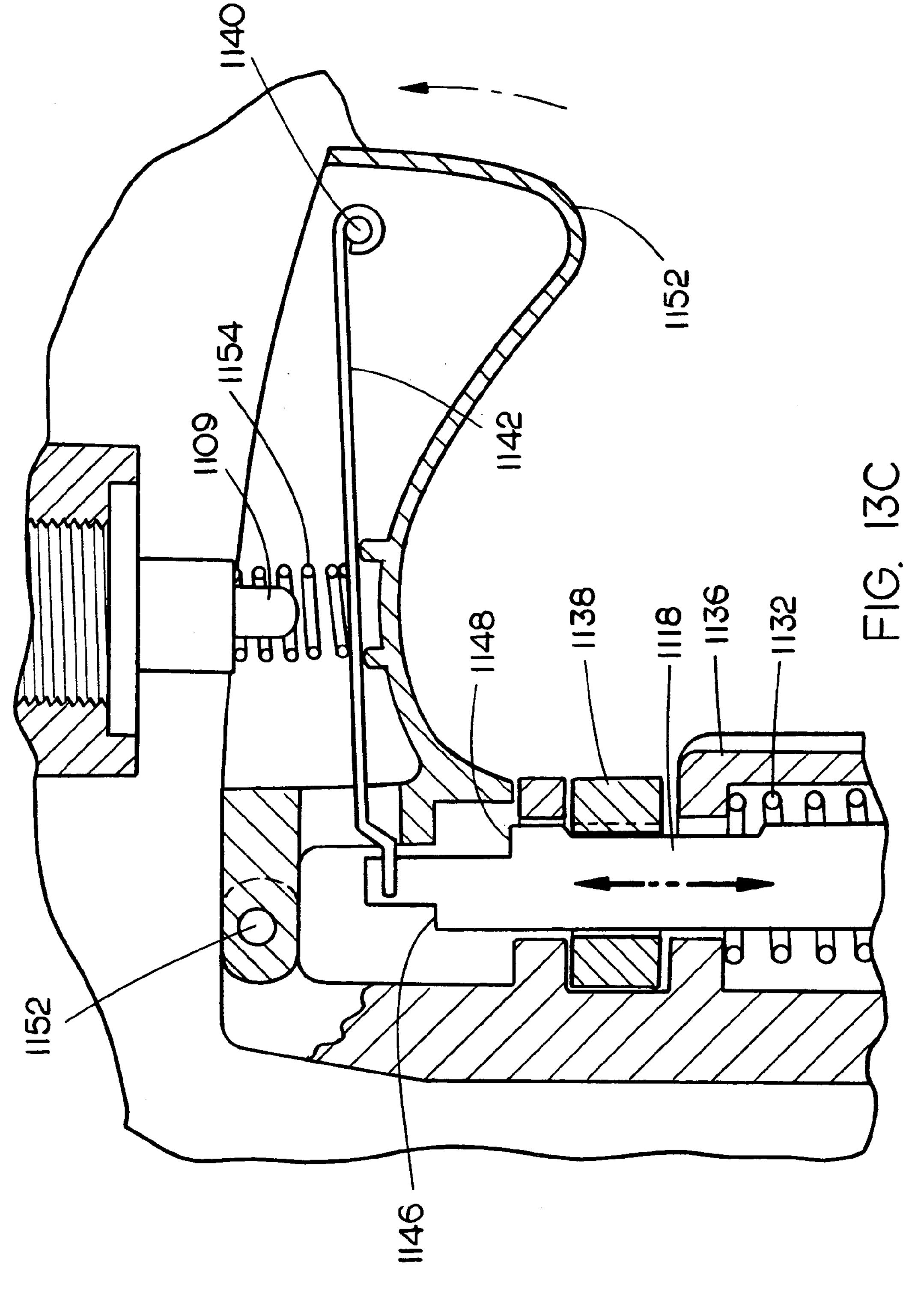
FIG. 13C is a cut-away side view of the dual actuation mode assembly illustrating a rotating rod in sequential actuation mode.

With particular reference to FIGS. 12 and 13A–C, the rod 1118 includes a first shoulder 1146 and a second shoulder 1148. The first and the second shoulders are formed at offset distances along the length of the rod 1118 such that the orientation of a trigger 1152 and thus, a trigger lever 1142 pivotally coupled via a trigger lever pivot pin 1140 to the trigger may be varied. For example, the orientation/lateral position of the trigger lever 1142 permits selecting contact actuation mode (as illustrated in FIG. 13B) when the first shoulder 1146 is orientated or rotated towards the trigger 1152. While sequential actuation (as observed in FIG. 13C) 1148 is achieved when a second shoulder which is further from the terminal end of the rod 1118 than the first shoulder 1146 is orientated or rotated towards the trigger 1152. The particular actuation mode selected (i.e., contact actuation or sequential actuation) is determined by the change in orientation/lateral position of the trigger 1152/trigger lever 1142 as the trigger assembly 1104 pivots about a trigger pivot pin 1156 and the selected shoulder contacts the trigger 1152. For example, as the trigger 1152 pivots about the trigger pivot pin 1156 and contacts with the select shoulder, included on the rod, such that the shoulder acts as a stop against which the trigger 1152 is positioned. Those of skill in the art will appreciate that the interface of the rod/trigger is off-centered from the trigger pivot pin 1156 thereby varying the point (along the trigger lever 1142) at which the valve 1109 will contact the trigger lever 1142 due to the relative orientation/position of the trigger lever 1142. In further embodiments, the trigger lever 1142/trigger 1152 is biased away from the pneumatic valve 1109 by a spring 1154 or the like such that a user is required to overcome the biasing force to activate the valve 1109. In the present embodiment, a central cylindrical projection extends beyond the first and the second shoulders 1146 and 1148, respectively. In this instance, the trigger lever and trigger, such as the lipped portion of the trigger for engaging a shoulder, may include a curved recess to permit passage of the projection. The trigger lever 1142 may be configured to engage with the rod 1118 so as to prevent a repeated fastening event when sequential actuation or firing mode is selected. In further instances, the first and the second shoulders may be formed by milling flattened portions into a rod. Preferably, the shoulders are arranged at 1800 (one hundred eighty degrees) from each other to permit sufficient engagement of the trigger and the selected shoulder.

With continued reference to FIGS. 11–13C, orientation of the rod 1118 may be achieved by rotating the rod 1118 such that a selected shoulder (the first shoulder 1146 or the second shoulder 1148) is aligned with a lip included on the trigger 1152. A toggle lever or switch 1138 is coupled to the rod 1118. In the present embodiment, the toggle switch 1138 is positioned below the trigger 1152 (with respect to the handle 1120) in order to permit a user to rotate the rod 1118 and thus, vary the pneumatic fastener's actuation mode by utilizing his/her forefinger and thumb. This positioning is additionally advantageous as a user may efficiently select between actuation modes without the complexity previously experienced. In the foregoing manner, a user may select between actuation modes more frequently thereby increasing efficiency over systems which require complex, time consuming manipulation. Preferably, the toggle switch defines an aperture through which the rod 1118 passes. In the present embodiment, a protrusion 1139 is formed by the toggle switch for extending into a keyway or channel extending longitudinally along at least a portion of the rod. In further embodiments, a setscrew may be utilized to accomplish this function. Those of skill in the art will appreciate a variety of mechanical interconnect systems may be implemented to achieve this function. For example, a portion of the rod may have a hexagonal cross section while a toggle switch includes a hexagonal aperture, a portion of the rod may be milled off or have a flattened portion or the like. Inclusion of a keyway or the like structure permits the toggle switch to remain in a fixed position (held in place via the contact safety housing 1136) with respect to the contact safety housing 1136/the driver housing 1108 while the rod is permitted to variously position along the driver housing. Those of skill in the art will appreciate that the toggle may be fixedly secured to the rod as well so that the toggle switch travels with the rod 1118 as the contact safety assembly 1106 is manipulated generally along the driver housing.

In further examples, the toggle switch 1138 may include a detent for engaging with the contact safety cover in order to frictionally secure the toggle switch in a desired orientation (i.e. contact actuation or sequential fire). Moreover, the toggle switch may include a cam shaped outer surface for frictionally engaging the contact safety housing to retain the toggle in a desired orientation. For example, a detent and/or cam surface may be included to secure the toggle switch in sequential fire mode. Those of skill in the art will appreciate that the lever portion of the toggle may act as an indicator or indicia of the selected actuation mode to permit ready recognition. Additional symbols or markings may be included on the driver housing, the contact safety housing or provided as an adhered label to one of the housing to alert the user as to the mode selected. Preferably, the toggle switch is orientated at 90° (ninety degrees) or perpendicular to a main axis of the trigger so that the selected contact mode is readily observed. For example, the toggle lever may be orientated approximately 180° (one hundred eighty degrees) when disposed in contact actuation mode than when disposed in sequential actuation mode.

Referring back to FIG. 3, the handle 102 includes a handle adapter 156, which enables the coupling of a compressed air supply to the pneumatic nail gun 100. The handle adapter 156 is connected with the inlet channel 126, which, via the housing inlet port 121 connected to the inner cap inlet conduit 182, provides compressed air to the head valve assembly 140. The handle 102 further includes a handle exhaust 158 which couples, via the outlet channel 128 and the housing outlet port 123, with the inner cap outlet conduit 184 to exhaust air from the pneumatic nail gun 100.

Figure 14:
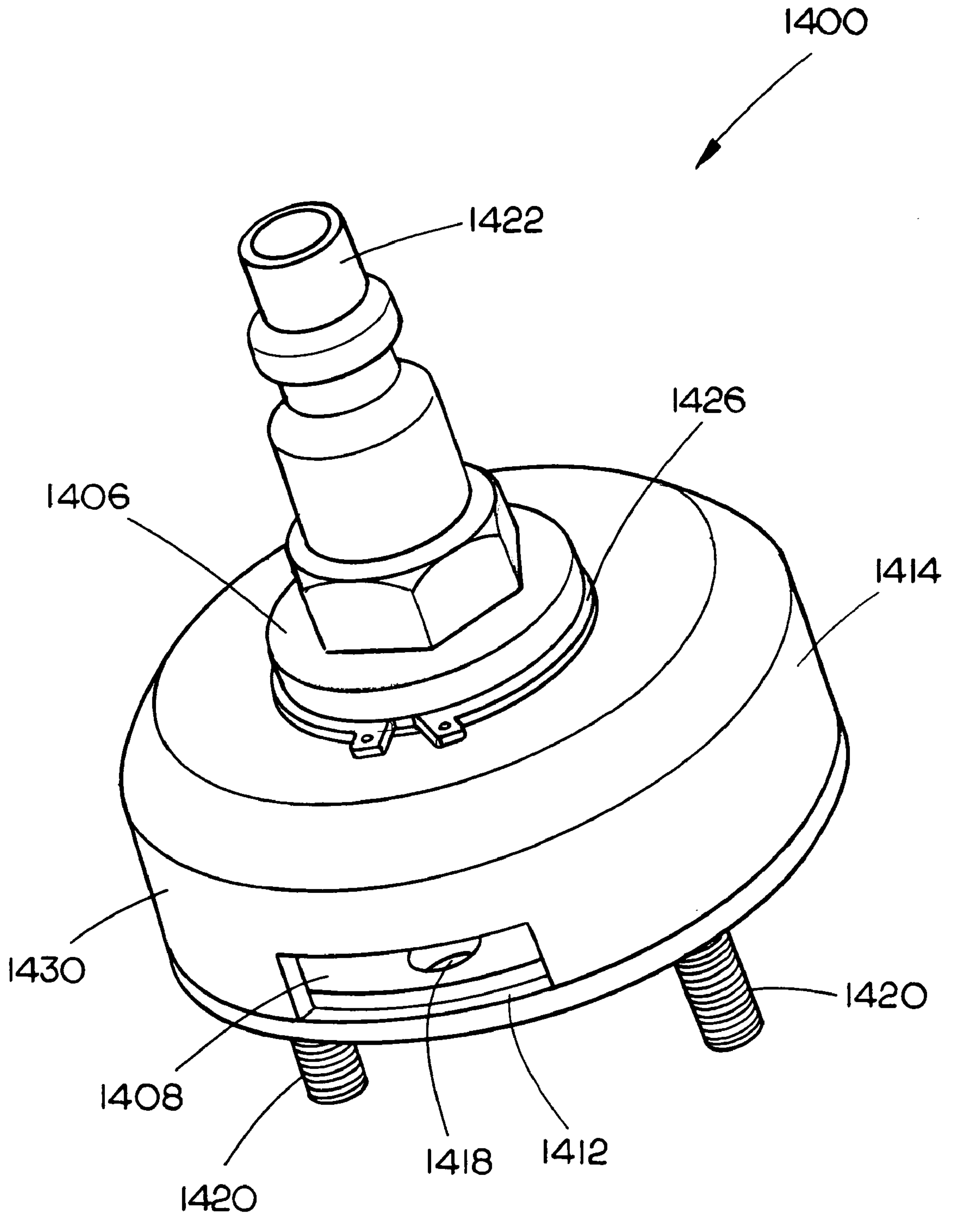
FIG. 14 shows an adjustable handle exhaust assembly for a pneumatic fastener in accordance with an exemplary embodiment of the present invention.
Figure 15:
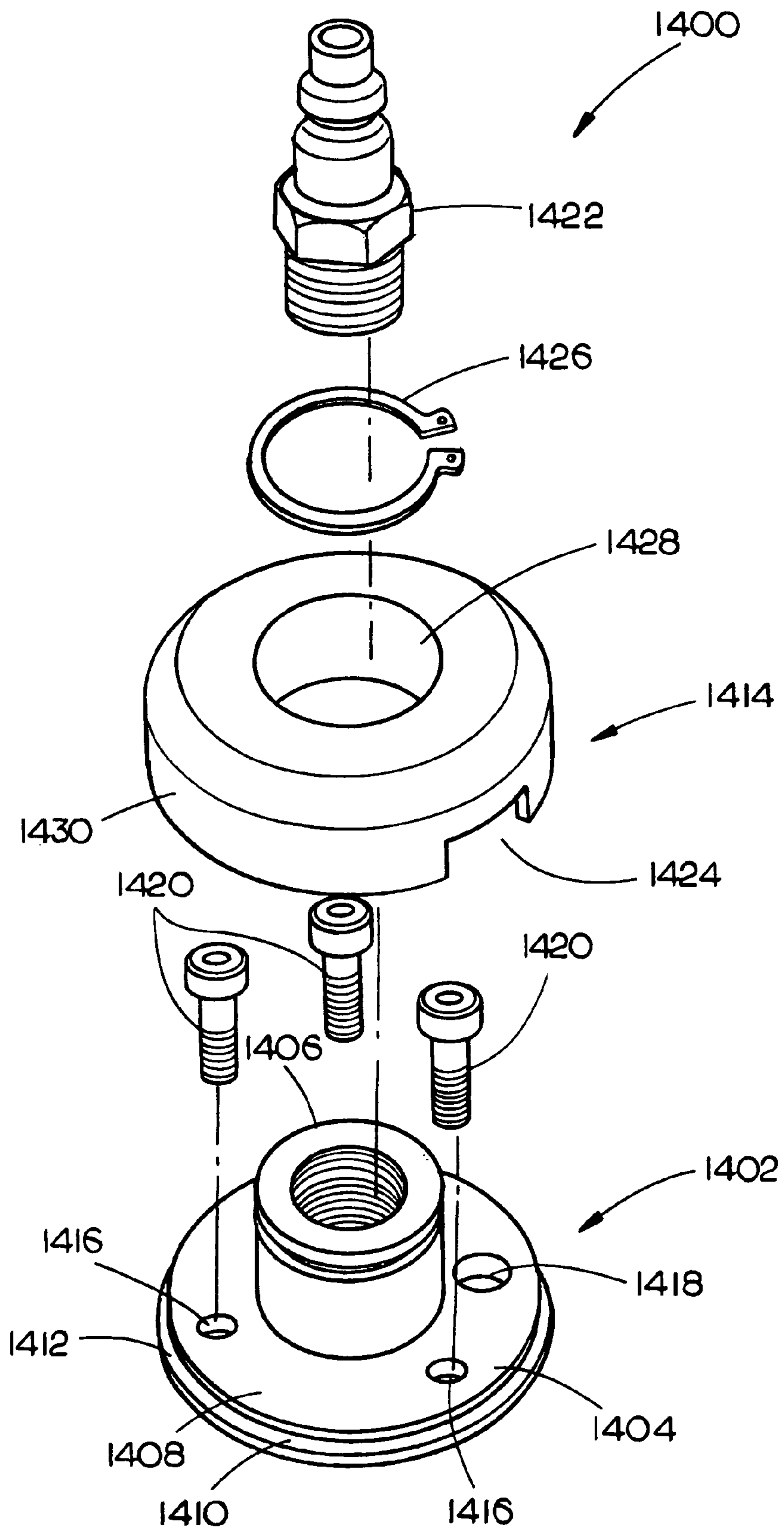
FIG. 15 is an exploded view of the adjustable handle exhaust assembly shown in FIG. 14.

Referring now to FIGS. 14 and 15, an adjustable handle exhaust assembly 1400 in accordance with an exemplary embodiment of the present invention is illustrated. The assembly 1400 may be coupled to a handle of a pneumatic fastener such as the pneumatic fastener 100 to replace the handle exhaust 158 and the handle adapter 156 (see FIG. 3). The adjustable handle exhaust assembly 1400 may be used to input compressed air into the inlet channel 126 and may enable an operator to direct the flow of exhaust coming from the outlet channel 128 in a desired direction (e.g., away from the operator). The exhaust assembly 1400 includes a base 1402, which includes a base plate 1404 and a cylindrical and centrally hollow protrusion 1406 protruding from and normal to the base plate 1404. Preferably, the base plate 1404 includes an inlet opening defined therethrough and includes a first portion 1408 and a second portion 1410. Both portions 1408, 1410 have a circular shape and are attached to each other. The first portion 1408 is smaller than the second portion 1410. That is, the diameter of the first portion 1408 is smaller than the diameter of the second portion 1410 so that a perimeter 1412 of the second portion 1410 is exposed for supporting a cap 1414. The base plate 1404 includes a plurality of openings 1416 and an exhaust opening 1418 defined therethrough. A plurality of bolts 1420 may be inserted into the corresponding plurality of openings 1416 to securely couple the base 1402 to the second end 105 of the handle 102 of the pneumatic fastener 100. The protrusion 1406 includes a threaded inner surface defining a channel for receiving a quick connector coupler 1422 and a partially threaded outer surface for receiving a compression ring 1426. The channel defined by the threaded inner surface of the protrusion 1406 is interconnected with the inlet opening of the base plate 1404. The cap 1414 may be made of metal, plastic, rubber, or the like. The cap 1414 includes an exit opening 1424 on its outer surface 1430 for letting the exhaust air exit the pneumatic fastener 100. Preferably, the cap 1414 is donut-shaped with a central hole 1428 defined therein. The cap 1414 is placed on top of the base 1402 so that the protrusion 1406 protrudes from the central hole 1428 and the cap 1414 is supported by the perimeter 1412 of the second portion 1410. Preferably, the cap 1414 is securely coupled to the base 1402 by the compression ring 1426 fastened on the partially threaded outer surface of the protrusion 1406 so that the exhaust inside the cap 1414 may exit to outside through the exit opening 1424. The cap 1414 may be easily rotated to change the position of the exit opening 1424 whereby exhaust air exiting the exit opening 1424 can be directed in a desired direction (e.g., away from an operator).

The adjustable handle exhaust assembly 1400 may be securely coupled to the second end 105 of the handle 102 of the pneumatic fastener 100 by the bolts 1420 to replace the handle adapter 156 and the handle exhaust 158. Preferably, the inlet opening of the base plate 1404 is interconnected with the inlet channel 126, and the exhaust opening 1418 is interconnected with the outlet channel 102. The quick connector coupler 1422 is connected to an air supply hose for supplying compressed air to the pneumatic fastener 100. The compressed air flows from the air supply hose into the inlet channel 126, via the quick connector coupler 1422, the channel defined by the threaded inner surface of the protrusion 1406, and the inlet opening of the base plate 1404. The exhaust in the outlet channel 128 flows into the cap 1414 via the exhaust opening 1418 and exits the cap 1414 via the exit opening 1424. An operator may rotate the cap 1414 easily to change the position of the exit opening 1424 so that the exhaust air exiting the exit opening 1424 is directed in a desired direction (e.g., away from the operator).

In a further exemplary embodiment directed to the present invention, a method of manufacturing a pneumatic fastener, such as the pneumatic fastener 100, is provided. In a first step a housing including a piston assembly is provided. The housing may be of various configurations to support the functional operation of the pneumatic fastener and address aesthetic and/or ergonometric considerations. The housing is further provided with a housing inlet port and a housing exhaust port. The next step involves positioning a handle, including a handle adapter for receiving compressed air and a handle exhaust for exhausting the compressed air, to be coupled with the housing. The handle including an inlet channel coupled with the handle adapter and an outlet channel coupled with the handle exhaust. The inlet channel is further coupled with the housing inlet port and the outlet channel is further coupled with the housing exhaust port. Next, a head valve assembly including an inner cap of the present invention, is established in operational connection with the piston assembly. The inner cap further includes an inner cap inlet conduit which couples with the housing inlet port and an inner cap exhaust conduit which couples with the housing exhaust port. An outer cap is then fastened to the housing, the outer cap at least partially encompassing the head valve assembly and coupling with the inner cap.

It is contemplated that the method manufacturing may further include the establishment of a groove into the outer cap. The groove being enabled to receive an O-ring gasket and for providing a seal between the outer cap and the inner cap. In an alternative embodiment, the method of manufacturing may include the establishment of a groove in the inner cap for receiving an O-ring gasket and establishing a seal between the outer cap and the inner cap.

It is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. Further, it is to be understood that the claims included below are merely exemplary of the present invention and are not intended to limit the scope of coverage which has been enabled by the written description.

What is claimed is:

1. An adjustable exhaust assembly for a pneumatic fastening tool having body and a handle extending from the body, the handle defining an inlet channel for receiving input of pressurized gas and an outlet channel for outputting exhaust gas, the adjustable exhaust assembly comprising:

a base attachable to an end of the handle opposite the body, the base defining an inlet opening and an outlet opening therethrough, the inlet opening in communication with the inlet channel and the outlet opening in communication with outlet channel; and a cap coupled to the base for rotation relative to the base while the cap is coupled to the base, the cap defining an exhaust opening in communication with the outlet opening such that rotation of the cap directs exhaust gas from the outlet channel in a plurality of directions.

2. The adjustable exhaust assembly of claim 1, wherein the base comprises a body portion that includes the outlet opening and a profusion extending from the body portion that includes the inlet opening.

3. The adjustable exhaust assembly of claim 2, wherein the cap comprises a generally cylindrical side wall and a top wall coupled to the side wall.

4. The adjustable exhaust assembly of claim 3, wherein the top wall defines a central hole that receives the protrusion therethrough.

5. The adjustable exhaust assembly of claim 3, wherein the side wall includes the exhaust opening.

6. The adjustable exhaust assembly of claim 3, wherein the top wall and the side wall at least in part define a donut-shaped internal channel in communication with the outlet opening and the exhaust opening.

7. The adjustable exhaust assembly of claim 3 further comprising a compression ring received over the protrusion to secure the cap to the base.

8. The adjustable exhaust assembly of claim 1, wherein the plurality of directions are generally transverse to an axis of the handle.

9. The adjustable exhaust assembly of claim 1, wherein the inlet opening is internally threaded for receiving a quick connector coupling.

10. The adjustable exhaust assembly of claim 1, wherein the base defines an aperture configured to receive a bolt for non-rotatably attaching the body portion to the handle.

11. A pneumatic fastening tool comprising:

a body containing a pneumatically actuated cylinder for driving a fastener;

a magazine coupled to the body for holding a plurality of fasteners;

a handle extending from the body, the handle defining an inlet channel for receiving input of compressed gas to the cylinder and an outlet channel for outputting exhaust gas from the cylinder;

an adjustable exhaust assembly attached to an end of the handle opposite the body, wherein the adjustable exhaust assembly comprises a cap coupled for rotation relative to the handle while the cap is coupled to the handle, the cap defining an exhaust opening in communication with the outlet channel such that rotation of the cap directs exhaust gas from the outlet channel in a plurality of directions.

12. The tool of claim 11, wherein the adjustable exhaust assembly comprises a base defining an inlet opening and an outlet opening therethrough, the inlet opening in communication with the inlet channel and the outlet opening in communication with outlet channel.

13. The tool of claim 11, wherein the base comprises a body portion that includes the outlet opening and a protrusion extending from the body portion that includes the inlet opening.

14. The tool of claim 13, wherein the cap comprises a generally cylindrical side wall and a top wall coupled to the side wall.

15. The tool of claim 14, wherein the top wall defines a central hole that receives the protrusion therethrough.

16. The tool of claim 14, wherein the side wall includes the exhaust opening.

17. The tool of claim 14, wherein the top wall and the side wall at least in part define a donut-shaped internal channel in communication with the outlet opening and the exhaust opening.

18. The tool of claim 14 further comprising a compression ring received over the protrusion to secure the cap to the base.

19. The tool of claim 11, wherein the plurality of directions are generally transverse to an axis of the handle.

* * * * *